United States Patent
Kazmi et al.

(10) Patent No.: US 9,119,036 B2
(45) Date of Patent: Aug. 25, 2015

(54) ENHANCED MEASUREMENT GAP CONFIGURATION SUPPORT FOR POSITIONING

(71) Applicant: Telefonaktiebolaget LM Ericsson (publ), Stockholm (SE)

(72) Inventors: Muhammad Ali Kazmi, Bromma (SE); Iana Siomina, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/095,549

(22) Filed: Dec. 3, 2013

(65) Prior Publication Data

US 2014/0094188 A1     Apr. 3, 2014

Related U.S. Application Data

(63) Continuation-in-part of application No. 13/143,520, filed as application No. PCT/SE2011/050895 on Jul. 1, 2011, now abandoned, application No. 14/095,549, which is a continuation-in-part of application No.

(Continued)

(51) Int. Cl.
*H04W 4/02* (2009.01)
*G01S 5/02* (2010.01)

(Continued)

(52) U.S. Cl.
CPC ............. *H04W 4/023* (2013.01); *G01S 5/0242* (2013.01); *G01S 5/10* (2013.01); *H04W 64/00* (2013.01)

(58) Field of Classification Search
CPC combination set(s) only.
See application file for complete search history.

(56) References Cited

U.S. PATENT DOCUMENTS

| | | | |
|---|---|---|---|
| 8,295,859 B1 | 10/2012 | Yarkan et al. | |
| 8,406,790 B2 * | 3/2013 | Kazmi et al. ............... | 455/456.1 |

(Continued)

FOREIGN PATENT DOCUMENTS

| | | |
|---|---|---|
| WO | 2008085952 A1 | 7/2008 |
| WO | 2009038359 A2 | 3/2009 |

(Continued)

OTHER PUBLICATIONS

Nokia, "Applicability of mobility requirements with inter-frequency RSTD measurements", 3GPP TSG-RAN Meeting #55, May 10-14, 2010, Montreal, Canada, R4-102039.

(Continued)

*Primary Examiner* — Diane Mizrahi
(74) *Attorney, Agent, or Firm* — Coats & Bennett, PLLC

(57) ABSTRACT

A base station is configured to serve a wireless device in a serving cell on a serving frequency. The base station obtains information that indicates one or more non-serving frequencies on which the device is to perform one or more positioning measurements. These positioning measurements are to be used for determining the device's geographic position. For at least one non-serving frequency indicated by the information, the base station configures a measurement gap during which the device is to perform a corresponding positioning measurement. Specifically, the base station configures such measurement gap to occur during a period of time in which a neighboring cell transmits a positioning reference signal over that non-serving frequency. A positioning reference signal is specifically designed to be a signal on which a device performs positioning measurements. Thus, by aligning the measurement gap with a positioning reference signal, the positioning measurements will prove more reliable and accurate.

35 Claims, 21 Drawing Sheets

Related U.S. Application Data

13/697,252, filed as application No. PCT/SE2011/005019 on Apr. 28, 2011, now Pat. No. 8,965,414.

(60) Provisional application No. 61/434,248, filed on Jan. 19, 2011, provisional application No. 61/333,007, filed on May 10, 2010.

(51) Int. Cl.
*G01S 5/10* (2006.01)
*H04W 64/00* (2009.01)

(56) References Cited

U.S. PATENT DOCUMENTS

| | | | |
|---|---|---|---|
| 8,750,808 B2* | 6/2014 | Kazmi et al. | 455/67.13 |
| 2008/0132247 A1 | 6/2008 | Anderson | |
| 2008/0146231 A1 | 6/2008 | Huang et al. | |
| 2008/0189970 A1 | 8/2008 | Wang et al. | |
| 2009/0005029 A1 | 1/2009 | Wang et al. | |
| 2009/0131073 A1 | 5/2009 | Carlson et al. | |
| 2009/0325501 A1 | 12/2009 | Somasundaram et al. | |
| 2010/0120447 A1 | 5/2010 | Anderson et al. | |
| 2010/0240358 A1 | 9/2010 | Jen et al. | |
| 2010/0304748 A1 | 12/2010 | Henttonen et al. | |
| 2010/0317343 A1 | 12/2010 | Krishnamurthy et al. | |
| 2010/0323720 A1 | 12/2010 | Jen | |
| 2011/0039577 A1 | 2/2011 | Stern-Berkowitz et al. | |
| 2011/0098057 A1 | 4/2011 | Edge et al. | |
| 2011/0117926 A1 | 5/2011 | Hwang et al. | |
| 2012/0083278 A1* | 4/2012 | Kazmi et al. | 455/440 |
| 2012/0184290 A1* | 7/2012 | Kazmi et al. | 455/456.1 |
| 2012/0252487 A1* | 10/2012 | Siomina et al. | 455/456.1 |
| 2012/0287800 A1 | 11/2012 | Siomina et al. | |
| 2013/0295958 A1* | 11/2013 | Siomina et al. | 455/456.1 |

FOREIGN PATENT DOCUMENTS

| | | |
|---|---|---|
| WO | 2009065012 A2 | 5/2009 |
| WO | 2010107356 A1 | 9/2010 |
| WO | 2011020008 A2 | 2/2011 |
| WO | 2012099514 A1 | 7/2012 |

OTHER PUBLICATIONS

3rd Generation Partnership Project, "Technical Specification Group Radio Access Network; Evolved Universal Terrestrial Radio Access (E-UTRA); Physical Channels and Modulation (Release 9)", 3GPP TS 36.211 V9.1.0, Mar. 2010, pp. 1-85.

3rd Generation Partnership Project, "Technical Specification Group Radio Access Network; Evolved Universal Terrestrial Radio Access (E-UTRA); LTE Positioning Protocol (LPP) (Release 9)", 3GPP TS 36.355 V9.1.0, Mar. 2010, pp. 1-111.

3rd Generation Partnership Project, "Technical Specification Group Radio Access Network; Evolved Universal Terrestrial Radio Access (E-UTRA); LTE Positioning Protocol A (LPPa) (Release 9)", 3GPP TS 36.455 V9.1.0, Mar. 2010, pp. 1-51.

3rd Generation Partnership Project, "Technical Specification Group Radio Access Network; Evolved Universal Terrestrial Radio Access (E-UTRA); Physical layer; Measurements (Release 9)", 3GPP TS 36.214 V9.1.0, Mar. 2010, pp. 1-14.

3rd Generation Partnership Project, "Technical Specification Group Radio Access Network; Evolved Universal Terrestrial Radio Access (E-UTRA); Radio Resource Control (RRC); Protocol Specification (Release 8)", 3GPP TS 36.331 V8.9.0, Mar. 2010, pp. 1-211.

3rd Generation Partnership Project, "Technical Specification Group Radio Access Network; Evolved Universal Terrestrial Radio Access (E-UTRA); Requirements for support of radio resource management (Release 8)", 3GPP TS 36.133 V8.9.0, Mar. 2010, pp. 1-328.

QUALCOMM Europe, "TS 36.305: Enhanced cell ID", 3GPP TSG-RAN WG2 #66, May 4, 2009, pp. 1-5, San Francisco, CA, USA, R2-093456.

3rd Generation Partnership Project, "Technical Specification Group Radio Access Network; Evolved Universal Terrestrial Radio Access (E-UTRA); Radio Resource Control (RRC); Protocol specification (Release 10)", 3GPP TS 36.331 V10.1.0, pp. 1-289, Mar. 1, 2011, Sophia-Antipolis Cedex, France.

European Telecommunications Standards Institute, "LTE; Evolved Universal Terrestrial Radio Access Network (E-UTRAN); Stage 2 functional specification of User Equipment (UE) positioning in E-UTRAN (3GPP TS 36.305 version 10.1.0 Release 10)", ETSI TS 136 305 V10.1.0, Apr. 1, 2011, pp. 7,11, 16-19, 40-42.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.6.0, Mar. 1, 2011, pp. 1-252, 3GPP, France.

CATT, et al., "Introduction of OTDOA inter-freq RSTD measurement indication procedure", 3GPP TSG-RAN WG2 Meeting #73, Taipei, Change Request 36.355 CR 0053, Rev. 1, Version 10.0.0, R2-111691, Feb. 8, 2011, pp. 1-5, 3GPP.

Nokia Siemens Networks, et al., "Measurement Gap Creation", 3GPP TSG-RAN WG4 Meeting #43bis, Jun. 25-29, 2007, Orlando, FL, R4-070927.

Sharp, "Measurement Gap Control for E-UTRAN", 3GPP TSG-RAN WG2#55, Oct. 9-13, 2006, Seoul, Korea, R2-062928.

Nokia, "Mobility requirements and inter-frequency RSTD measurements", 3GPP TSG-RAN WG4 Ad hoc meeting #10-02, Mar. 12-16, 2010, Dublin, Ireland, R4-101388.

Motorola, "Measurement Gap Control for E-UTRAN to GERAN Handover", 3GPP RAN-GERAN Workshop on GERAN/LTE, Sep. 27-28, 2007, Sophia-Antipolis, France, GR-070006.

Huawei, "Considerations on Gap Length Design for Gap-assisted E-UTRA Measurements", 3GPP TSG-RAN WG4 Working Group 4 (Radio) meeting #43bis, Jun. 25-29, 2007, Orlando, FL, R4-070958.

Ericsson et al., "Measurement gap configuration for inter-freq RSTD measurement", 3GPP TSG-RAN WG2 #72, Nov. 15-19, 2010, Jacksonville, FL, R2-106464.

Ericsson et al., "Inter-frequency measurements for OTDOA positioning", 3GPP TSG RAN WG4 meeting #54, Feb. 22-26, San Francisco, CA, R4-100874.

Huawei et al., "Remaining issues when UE performs inter-frequency RSTD measurement", 3GPP TSG RAN WG4 (Radio) #57 AH, Jan. 17-21, 2011, Austin, US, R4-110177.

\* cited by examiner

```
ProvideAssistanceData-r9-IEs ::= SEQUENCE {
    commonIesProvideAssistanceData    CommonIesProvideAssistanceData    OPTIONAL,    -- Need ON
    a-gnss-ProvideAssistanceData      A-GNSS-ProvideAssistanceData      OPTIONAL,    -- Need ON
    otdoa-ProvideAssistanceData       OTDOA-ProvideAssistanceData       OPTIONAL,    -- Need ON
    epdu-Provide-Assistance-Data      EPDU-Sequence                     OPTIONAL,    -- Need ON
    ...
}
```

*FIG. 11*
*(PRIOR ART)*

```
RequestAssistanceData-r9-IEs ::= SEQUENCE {
    commonIEsRequestAssistanceData   CommonIEsRequestAssistanceData   OPTIONAL,  -- Need ON
    a-gnss-RequestAssistanceData     A-GNSS-RequestAssistanceData     OPTIONAL,  -- Need ON
    otdoa-RequestAssistanceData      OTDOA-RequestAssistanceData      OPTIONAL,  -- Need ON
    epdu-RequestAssistanceData       EPDU-Sequence                    OPTIONAL,  -- Need ON
    ...
}
```

*FIG. 12*
*(PRIOR ART)*

```
-- ASN1START

OTDOA-ProvideAssistanceData ::= SEQUENCE {
    otdoa-ReferenceCellInfo      OTDOA-ReferenceCellInfo       OPTIONAL,
    otdoa-NeighbourCellInfo      OTDOA-NeighbourCellInfoList   OPTIONAL,
    otdoa-Error                  OTDOA-Error                   OPTIONAL,
    ...
}

-- ASN1STOP
```

*FIG. 13*
*(PRIOR ART)*

```
-- ASN1START

OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement OTDOA-NeighbourCellInfoElement ::= SEQUENCE {
    physCellId          INTEGER (0..503),
    cellGlobalId        ECGI                                            OPTIONAL,   -- Need ON
    earfcn              AFRCN-ValueEUTRA                                OPTIONAL,   -- Cond NotSameAsRef0
    cpLength            ENUMERATED {normal, extended, ...}
                                                                        OPTIONAL,
    prsInfo             PRS-Info                                        OPTIONAL,   -- Cond NotSameAsRef1
    antennaPortConfig   ENUMERATED {ports-1-or-2, ports-4,...}          OPTIONAL,   -- Cond NotSameAsRef2
    slotNumberOffset    INTEGER (0..31)                                 OPTIONAL,   -- Cond NotSameAsRef3
    prs-SubframeOffset  INTEGER (0..1279)                               OPTIONAL,   -- Cond NotSameAsRef4
    expectedRSTD        INTEGER (0..16383),                                         -- Cond InterFreq
    expectedRSTD-Uncertainty  INTEGER (0..1023),
    ...
} maxFreqLayers   INTEGER ::= 3

-- ASN1STOP
```

*FIG. 14*

```
-- ASN1START

UL-DCCH-Message ::=    SEQUENCE {
    message                UL-DCCH-MessageType
}

UL-DCCH-MessageType ::= CHOICE {
    c1                                    CHOICE {
        csfbParametersRequestCDMA2000         CSFBParametersRequestCDMA2000,
        measurementReport                     MeasurementReport,
        rrcConnectionReconfigurationComplete  RRCConnectionReconfigurationComplete,
        rrcConnectionReestablishmentComplete  RRCConnectionReestablishmentComplete,
        rrcConnectionSetupComplete            RRCConnectionSetupComplete,
        securityModeComplete                  SecurityModeComplete,
        securityModeFailure                   SecurityModeFailure,
        ueCapabilityInformation               UECapabilityInformation,
        ulHandoverPreparationTransfer         ULHandoverPreparationTransfer,
        ulInformationTransfer                 ULInformationTransfer,
        counterCheckResponse                  CounterCheckResponse,
        ueInformationResponse-r9              UEInformationResponse-r9,
        proximityIndication-r9                ProximityIndication-r9,
        rnReconfigurationComplete-r10         RNReconfigurationComplete-r10,
        interFreqRSTDMeasurementIndication-r10 InterFreqRSTDMeasurementIndication-r10,
        spare1 NULL
    },
    messageClassExtension SEQUENCE {}
}

-- ASN1STOP
```

*FIG. 15*

```
-- ASN1START
InterFreqRSTDMeasurementIndication-r10 ::=    SEQUENCE {
    criticalExtensions         CHOICE {
        c1                     CHOICE{
            interFreqRSTDMeasurementIndication-r10    InterFreqRSTDMeasurementIndication-r10-IEs,
            spare3 NULL, spare2 NULL, spare1 NULL
        },
        criticalExtensionsFuture    SEQUENCE {}
    }
}

InterFreqRSTDMeasurementIndication-r10-IEs ::=    CHOICE {
    rstd-InterFreqIndication-r10    CHOICE {
        start                       SEQUENCE {
            rstd-InterFreqInfoList-r10    RSTD-InterFreqInfoList-r10
        },
        stop                        NULL
    },
    nonCriticalExtension            SEQUENCE {}                OPTIONAL
}

RSTD-InterFreqInfoList-r10 ::= SEQUENCE ( SIZE(1..maxRSTD-Freq-r10) ) OF RSTD-InterFreqInfo-r10

RSTD-InterFreqInfo-r10 ::=    SEQUENCE {
    carrierFreq-r10               ARFCN-ValueEUTRA,
    measPRS-Offset-r10            INTEGER (0..39)
}

-- ASN1STOP
```

FIG. 16

ENHANCED MEASUREMENT GAP CONFIGURATION SUPPORT FOR POSITIONING

RELATED APPLICATIONS

This application is a continuation-in-part of U.S. patent application Ser. No. 13/143,520, filed Aug. 31, 2011, which claims the benefit of International Patent Application Serial No. PCT/SE2011/050895, filed Jul. 1, 2011, which claims the benefit of U.S. Provisional Patent Application Ser. No. 61/434,248, filed Jan. 19, 2011, each of which is incorporated herein by reference in its entirety. This application is also a continuation-in-part of U.S. patent application Ser. No. 13/697,252, filed Nov. 9, 2012, which claims the benefit of International Patent Application Serial No. PCT/SE2011/050519, filed Apr. 28, 2011, which claims the benefit of U.S. Provisional Patent Application Ser. No. 61/333,007, filed May 10, 2010, each of which is incorporated herein by reference in its entirety.

TECHNICAL FIELD

The present invention generally relates to wireless communications systems, and more particularly relates to systems in which wireless devices perform positioning measurements on one or more non-serving cell frequencies.

BACKGROUND

The ability to identify the geographic position of a user equipment (UE) in a wireless communications system has enabled and/or enhanced a large variety of commercial and non-commercial services, e.g., navigation assistance, social networking, location-aware advertising, emergency calls, etc. Different services may have different positioning accuracy requirements. In addition, some regulatory requirements on the positioning accuracy for basic emergency services exist in some countries, e.g., in the United States, where the Federal Communications Commission imposes regulatory requirements for Enhanced-911 services.

In many environments, the position of a UE can be accurately estimated by using positioning methods based on GPS (Global Positioning System). However, GPS is known to often fail in indoor environments and urban canyons. In these and other situations, the wireless communication system itself can assist the UE to determine its position with GPS. This approach is commonly referred to as Assisted-GPS positioning, or simply A-GPS, and serves to improve the UE receiver sensitivity and GPS start-up performance. Despite the possibility of this assistance, GPS and A-GPS still prove insufficient under some circumstances. Indeed, some UE's may not even be capable of using GPS or A-GPS.

A complementary terrestrial positioning method, called Observed Time Difference of Arrival (OTDOA), has therefore been standardized by the $3^{rd}$ Generation Partnership Project (3GPP). In addition to OTDOA, the Long Term Evolution (LTE) standard also specifies methods, procedures, and signalling support for Enhanced Cell ID (E-CID) and Assisted Global Navigation Satellite System (A-GNSS). Uplink Time Difference of Arrival (UTDOA) is also being standardized for LTE.

Positioning in LTE

The three key network elements in an LTE positioning architecture are the Location Services (LCS) Client, the LCS target device (i.e., the UE), and the LCS Server. The LCS Server estimates the position of the LCS target device. Specifically, the LCS Server is a physical or logical entity that manages positioning for the LCS target device by collecting measurements and other location information, that assists the LCS target device in measurements when necessary, and that estimates the LCS target device's position. The LCS Client may or may not reside in the LCS target device itself. Regardless, the LCS Client is a software and/or hardware entity that interacts with the LCS Server for the purpose of obtaining location information for the LCS target device. Specifically, the LCS Client sends a request to the LCS Server to obtain location information. The LCS Server processes and serves the received requests, and then sends the positioning result and optionally a velocity estimate to the LCS Client. A positioning request can be originated from the LCS target device or the network.

Position calculation can be conducted, for example, by a UE or by a positioning server, such as an Evolved Serving Mobile Location Center (E-SMLC) or Secure User Plan Location (SUPL) Location Platform (SLP) in LTE. The former approach corresponds to the UE-based positioning mode, whilst the latter corresponds to the UE-assisted positioning mode.

Two positioning protocols operating via the radio network exist in LTE, LTE Positioning Protocol (LPP) and LPP Annex (LPPa). The LPP is a point-to-point protocol between an LCS Server and an LCS target device, and is used in order to position the LCS target device. LPP can be used both in the user and control plane, and multiple LPP procedures are allowed in series and/or in parallel in order to reduce latency. LPPa is a protocol between an eNodeB and the LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently Open Mobiel Alliance (OMA) LPP extensions are being specified (LPPe) to allow e.g. for operator-specific assistance data, assistance data that cannot be provided with LPP, or to support other position reporting formats or new positioning methods.

A high-level architecture of such an LTE system 10 is illustrated in FIG. 1. In FIG. 1, the system 10 includes a UE 12, a radio access network (RAN) 14, and a core network 16. The UE 12 comprises the LCS target. The core network 16 includes an E-SMLC 18 and/or an SLP 20, either of which may comprise the LCS Server. The control plane positioning protocols with the E-SMLC 14 as the terminating point include LPP, LPPa, and LCS-AP. The user plane positioning protocols with the SLP 16 as the terminating point include SUPL/LPP and SUPL. Although note shown, the SLP 20 may comprise two components, a SUPL Positioning Center (SPC) and a SUPL Location Center (SLC), which may also reside in different nodes. In an example implementation, the SPC has a proprietary interface with E-SMLC, and an Llp interface with the SLC. The SLC part of the SLP communicates with a P-GW (PDN-Gateway) 22 and an External LCS Client 24.

Additional positioning architecture elements may also be deployed to further enhance performance of specific positioning methods. For example, deploying radio beacons 26 is a cost-efficient solution which may significantly improve positioning performance indoors and also outdoors by allowing more accurate positioning, for example, with proximity location techniques.

Positioning Methods

To meet Location Based Service (LBS) demands, the LTE network will deploy a range of complementing methods characterized by different performance in different environments.

Depending on where the measurements are conducted and where the final position is calculated, the methods can be UE-based, UE-assisted, or network-based. Each of these approaches has its own advantages and disadvantages. The following methods are available in the LTE standard for both the control plane and the user plane: (1) Cell ID (CID), (2) UE-assisted and network-based E-CID, including network-based angle of arrival (AoA), (3) UE-based and UE-assisted A-GNSS (including A-GPS), and (4) UE-assisted OTDOA.

Hybrid positioning, fingerprinting positioning and adaptive E-CID (AECID) do not require additional standardization and are therefore also possible with LTE. Furthermore, there may also be UE-based versions of the methods above, e.g. UE-based GNSS (e.g. GPS) or UE-based OTDOA, etc. There may also be some alternative positioning methods such as proximity based location.

Similar methods, which may have different names, also exist in other RATs, e.g. WCDMA or GSM.

E-CID Positioning

E-CID positioning exploits the advantages of low-complexity and fast positioning associated with CID, but enhances positioning further with more measurement types. Specifically, CID exploits the network's knowledge of geographical areas associated with cell IDs. E-CID additionally exploits the corresponding geographical description of the serving cell, the Timing Advance (TA) of the serving cell, and the CIDs and the corresponding signal measurements of the cells (up to 32 cells in LTE, including the serving cell), as well as AoA measurements. The following UE measurements can be utilized for E-CID in LTE: E-UTRA carrier Received Signal Strength Indicator (RSSI), Reference Signal Received Power (RSRP), Reference Signal Received Quality (RSRQ), and UE Rx–Tx time difference. The E-UTRAN measurements available for E-CID are eNodeB Rx–Tx time difference (also called TA Type 2), TA Type 1 being (eNodeB Rx–Tx time difference)+(UE Rx–Tx time difference), and UL AoA. UE Rx–Tx measurements are typically used for the serving cell, whilst e.g. RSRP and RSRQ as well AoA can be utilized for any cell and can also be conducted on a frequency different from that of the serving cell.

The UE's E-CID measurements are reported by the UE to the positioning server (e.g. E-SMLC or SLP) over LPP, and the E-UTRAN E-CID measurements are reported by the eNodeB to the positioning node over LPPa. The UE may receive assistance data from the network e.g. via LPPe (no LPP assistance for E-CID is currently specified in the standard, however, it may be sent via LPP extension protocol, LPPe).

OTDOA Positioning

The OTDOA positioning method makes use of the measured timing of downlink signals received from multiple eNodeBs at the UE. The UE measures the timing of the received signals using assistance data received from the LCS server, and the resulting measurements are used to locate the UE in relation to the neighbouring eNodeBs.

With OTDOA, a terminal measures the timing differences for downlink reference signals received from multiple distinct locations. For each (measured) neighbor cell, the UE measures Reference Signal Time Difference (RSTD) which is the relative timing difference between neighbor cell and the reference cell. The UE position estimate is then found as the intersection of hyperbolas corresponding to the measured RSTDs. At least three measurements from geographically dispersed base stations with a good geometry are needed to solve for two coordinates of the terminal and the receiver clock bias. In order to solve for position, precise knowledge of the transmitter locations and transmit timing offset is needed.

To enable positioning in LTE, and to facilitate positioning measurements of a proper quality and for a sufficient number of distinct locations, new physical signals dedicated for positioning have been introduced. 3GPP TS 36.211. These new signals are called positioning reference signals (PRS). Also, low-interference positioning subframes have been specified.

PRS are transmitted from one antenna port (R6) according to a pre-defined pattern. 3GPP TS 36.211. A frequency shift, which is a function of Physical Cell Identity (PCI), can be applied to the specified PRS patterns to generate orthogonal patterns and modelling the effective frequency reuse of six. This makes it possible to significantly reduce neighbour cell interference on the measured PRS and thus improve positioning measurements.

Assistance Data for Positioning

Assistance data is intended to assist a wireless device or a radio node in its positioning measurements. Different sets of assistance data are typically used for different methods. The positioning assistance data is typically sent by the positioning server, although it may be sent via other nodes. For example, assistance data may be sent to an eNodeB for being further sent to the UE, e.g. transparently to eNodeB and also Mobility Management Entity (MME). The assistance data may also be sent by the eNodeB via LPPa to positioning server for further transfer to the UE.

The assistance data may be sent responsive to a request from the wireless device that will perform measurements. Alternatively, the assistance data may be sent in an unsolicited way; that is, without request.

In LTE, the assistance data may be requested and provided over LPP protocol by including requestAssistanceData and provideAssistanceData elements in the LPP message, respectively. The current LTE standard specifies the structure shown in FIG. 11 for provideAssistanceData. In this structure, the commonIEsProvideAssistanceData IE is provided for future extensibility only, and is thus not currently used. The LTE assistance data may thus be provided for A-GNSS and OTDOA. The EPDU-Sequence contains IEs that are defined externally to LPP by other organizations, which currently may only be used for OMA LPP extensions (LPPe).

A similar structure exists for requestAssistanceData, and is shown in FIG. 12. In FIG. 12, commonIEsRequestAssistanceData may optionally carry the serving cell ID (ECGI).

OTDOA Assistance Data

Since for OTDOA positioning PRS signals from multiple distinct locations need to be measured, the UE receiver may have to deal with PRS that are much weaker than those received from the serving cell. Furthermore, without the approximate knowledge of when the measured signals are expected to arrive in time and what is the exact PRS pattern, the UE would need to do signal search within a large window. Such a search would impact the time and accuracy of the measurements, as well as the UE complexity. To facilitate UE measurements, the network transmits assistance data to the UE, which includes, among others things, reference cell information, a neighbour cell list containing PCIs of neighbour cells, the number of consecutive downlink subframes, PRS transmission bandwidth, frequency, etc.

For OTDOA, the assistance data is provided with IE OTDOA-ProvideAssistanceData which comprises the information about the reference cell (one cell in the list) and neighbor cells information (multiple cells). This IE is shown in FIG. 13.

The neighbour cells may or may not be on the same frequency as the reference cell, and the reference cell may or may not be on the same frequency as the serving cell. Measurements that involve cells on a frequency different than the serving cell are inter-frequency measurements. Measurements on the same frequency as the serving cell are intra-frequency measurements. Different requirements apply for intra- and inter-frequency measurements.

The current standard only allows including E-UTRA cells in the assistance data. However, the cells may still belong to FDD and TDD which are treated as different RATs.

E-CID Assistance Data

Assistance data delivery is not required for UE- or eNodeB-assisted forms of E-CID positioning. In fact, this is not currently supported without EPDU elements. Also, UE-based E-CID location is not currently supported either, and the assistance data delivery procedure is not applicable to uplink E-CID positioning. No assistance data is currently specified for E-CID for LPP. Some assistance data, however, may be provided for E-CID e.g. via LPPe.

Assistance Data Extensions with OMA

With Open Mobile Alliance (OMA) LPP extension (LPPe), the assistance data is enhanced with the possibility to assist a larger range of positioning methods (e.g. assistance data may also be provided for E-CID or other methods of other RATs, e.g. OTDOA UTRA or E-OTD GSM, or other PLMN networks). Furthermore, there is also a possibility of carrying over a black-box data container meant for carrying vendor-/operator-specific assistance data.

Inter-Frequency, Inter-Band and Inter-RAT Measurements

It is mandatory for all UEs to support all intra-RAT measurements (i.e. inter-frequency and intra-band measurements) and meet the associated requirements. However the inter-band and inter-RAT measurements are UE capabilities, which are reported to the network during call setup. The UE supporting certain inter-RAT measurements should meet the corresponding requirements. For example a UE supporting LTE and WCDMA should support intra-LTE measurements, intra-WCDMA measurements and inter-RAT measurements (i.e. measuring WCDMA when the serving cell is LTE and measuring LTE when the serving cell is WCDMA). Hence the network can use these capabilities according to its strategy. These capabilities are highly driven by factors such as market demand, cost, typical network deployment scenarios, frequency allocation, etc.

Inter-Frequency Measurements

Inter-frequency measurements may in principle be considered for any positioning method, even though currently not all measurements are specified by the standard as intra- and inter-frequency measurements. When performing inter-frequency measurement, the serving and target carrier frequencies may belong to the same duplex mode or to different duplex modes e.g. LTE FDD-FDD inter-frequency, LTE TDD-TDD inter-frequency, LTE FDD-TDD inter-frequency or LTE TDD-FDD inter-frequency scenario. The FDD carrier may operate in full duplex or even in half duplex mode. The examples of inter-frequency measurements currently specified by the standard are Reference Signal Time Difference (RSTD) used for OTDOA, RSRP and RSRQ which may be used e.g. for fingerprinting or E-CID.

The UE performs inter-frequency and inter-RAT measurements in measurement gaps. The measurements may be done for various purposes: mobility, positioning, self organizing network (SON), minimization of drive tests etc. Furthermore the same gap pattern is used for all types of inter-frequency and inter-RAT measurements. Therefore E-UTRAN must provide a single measurement gap pattern with constant gap duration for concurrent monitoring (i.e. cell detection and measurements) of all frequency layers and RATs.

In LTE, measurement gaps are configured by the network to enable measurements on the other LTE frequencies and/or other RATs (e.g. UTRA, GSM, CDMA2000, etc). The gap configuration is signaled to the UE from the serving cell radio node over the Radio Resource Control (RRC) protocol as part of the measurement configuration. A UE that requires measurement gaps for positioning measurements, e.g., OTDOA, may send an indication to the network, e.g. eNodeB, upon which the network may configure the measurement gaps. Furthermore, the measurement gaps may need to be configured according to a certain rule, e.g. inter-frequency RSTD measurements for OTDOA require that the measurement gaps are configured according to the inter-frequency requirements in 36.133, Section 8.1.2.6, e.g. not overlapping with PRS occasions of the serving cell and using gap pattern #0.

In a carrier aggregation system, there may be multiple serving cells. In this case, a set of serving cells for a UE in a carrier aggregation mode comprises one primary cell and one or more configured secondary cells. A carrier aggregation capable UE generally does not require measurement gaps for performing measurements on configured and activated primary and secondary cells. However, there may be cells in the system that are not configured or not activated as serving cells for the UE, e.g., for one of the following reasons: the UE may be capable of supporting only a limited number of serving cells and/or some cells may be deactivated for carrier aggregation or not configured as secondary cells. For performing measurements on these cells, the UE would normally still require measurement gaps.

Inter-RAT Measurements

In general, in LTE inter-RAT measurements are typically defined similar to inter-frequency measurements. That is, inter-RAT measurements may also require configuring measurement gaps, but just with more measurement restrictions and often more relaxed requirements. As a special example there may also be multiple networks, which use overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1x RTT Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to the positioning node (e.g. E-SMLC in LTE).

Inter-Band Measurements

Inter-band measurement refers to the measurement done by the UE on a target cell on the carrier frequency belonging to a frequency band different than that of the serving cell. Both inter-frequency and inter-RAT measurements can be intra-band or inter-band.

The motivation of inter-band measurements is that most of the UEs today support multiple bands even for the same technology. This is driven by the interest from service providers; a single service provider may own carriers in different bands and would like to make efficient use of carriers by performing load balancing on different carriers. A well known example is that of multi-band GSM terminal with 800/900/1800/1900 bands. Another example is when a DL band has no paired UL within the same band and thus has to be paired with UL from another frequency band.

Furthermore a UE may also support multiple technologies e.g. GSM, UTRA FDD and E-UTRAN FDD. Since all UTRA and E-UTRA bands are common, therefore the multi-RAT UE may support same bands for all the supported RATs.

Inter-Frequency Requirements for Positioning-Related Timing Measurements

No inter-frequency requirements are currently defined for UE or eNodeB Rx–Tx measurements. For OTDOA, the current standard defines inter-frequency requirements for RSTD measurements assuming the following two scenarios, 3GPP TS 36.133. In the first scenario, the reference cell and all neighbor cells provided in the assistance data operate on the same frequency f2, which is different from the serving cell frequency f1. In the second scenario, the reference cell is on the serving cell frequency f1, whilst all neighbor cells provided in the assistance data are on frequency f2, which is different from the serving cell f1. The requirements are generic with respect to the frequency channels and frequency bands, i.e. the requirements are the same for any two different f1 and f2, independently on their absolute and relative location in the spectrum. In real deployments there may also be intermediate scenarios between the first scenario and the second scenario. Further, although the requirements are only defined for two frequencies, the signalling specified for OTDOA positioning supports up to three frequencies that may be different from the reference cell frequency, which in turn may also be different from the serving/primary cell frequency.

Problems with Existing Solutions

At least the following problems have been identified with the prior art solutions.

An eNodeB is heretofore unable to properly configure measurement gaps for a UE performing inter-frequency RSTD measurements. Indeed, the eNodeB is not even aware of the frequency or cell IDs on which the measurements are to be performed and thus is not be able e.g. to align PRS positioning occasions with measurement gaps. The consequence is that the measurement gaps are incorrectly configured, or do not provide sufficiently many or a required number of subframes with PRS for positioning measurements. This means that the UE measurements may fail or the measurement requirements may not be met.

Furthermore, there is currently no way to configure and use measurement gaps for inter-RAT positioning, for the measurements requested via assistance data received using LPPe or the user plane, or for non PRS-based measurements (which may or may not be performed according to a pattern, e.g., a restricted measurement pattern configured with enhanced inter-cell interference coordination (eICIC)).

Moreover, the measurement gaps to be applied by the UE are configured by the eNodeB over RRC. However it is the positioning server, e.g. E-SMLC, which is aware of whether and when the UE will conduct positioning inter-frequency measurements such as e.g., inter-frequency RSTD or inter-frequency E-CID and this information is transmitted to the UE transparently via the eNodeB. Thus, to be on the safe side the eNodeB may always configure UEs for the worst case, i.e. with Gap Pattern #0 (where a measurement gap of 6 ms occurs every 40 ms), even when the UEs measure only on intra-frequency cells. This is a severe restriction on the network in that it reduces the amount of radio resources available for intra-frequency measurements and it leads to an inefficient measurement procedure.

SUMMARY

A base station taught herein configures one or more measurement gaps during which a wireless device is to perform one or more positioning measurements on one or more non-serving frequencies. The base station advantageously configures the one or more measurement gaps based on information obtained regarding the one or more non-serving frequencies on which the positioning measurements will be performed. By configuring the measurement gaps in this way, the base station is able to intelligently align the configured measurement gaps with the occurrence of positioning reference signals from neighboring cells. So aligned, the device's positioning measurements prove more reliable and accurate than in prior approaches. Indeed, in some cases, positioning measurements in prior approaches may completely fail, while those herein would not.

In more detail, a base station herein is configured to serve a wireless device in a serving cell on a serving frequency. The base station obtains information that indicates one or more non-serving frequencies on which the wireless device is to perform one or more positioning measurements. These positioning measurements are to be used by, e.g., the device itself or another node in the system, for determining the wireless device's geographic position. For at least one non-serving frequency indicated by the obtained information, the base station configures a measurement gap during which the wireless device is to perform a corresponding positioning measurement. Specifically, the base station configures such measurement gap to occur during a period of time in which a neighboring cell transmits a positioning reference signal over that non-serving frequency. A positioning reference signal as used herein is specifically designed (e.g., with good signal quality) to be a signal on which a wireless device performs positioning measurements. Thus, by aligning the measurement gap with the transmission of a positioning reference signal, the positioning measurements will be more likely to succeed and will be of better quality.

In at least some embodiments, the information obtained by the base station only indicates the one or more non-serving frequencies on which the wireless device is to perform the one or more positioning measurements. In other embodiments, the information also identifies at least one neighboring cell on which the wireless device is to perform the one or more positioning measurements. In this case, a cell may be identified by cell-specific information, such as a cell identifier. In still other embodiments, the information also actually indicates the periods of time during which one or more neighboring cells will transmit respective signals intended for positioning measurements on the indicated non-serving frequencies.

In at least one embodiment, the base station obtains the information from a database in the base station's memory. In other embodiments, the base station obtains the information from a network node in the wireless communication system, e.g., a positioning node, an O&M node, or a SON node. In still other embodiments, the base station obtains the information from the wireless device itself. In further embodiments, the base station obtains the information by inspecting higher layer communications transmitted between the positioning node and the wireless device.

Regardless of the particular information indicated in addition to the non-serving frequencies or the particular way in which the base station obtains the information, in some embodiments the base station is somewhat restricted in the sense that it must configure the measurement gaps according to one or more pre-defined rules. For example, in one embodiment, the base station must configure the measurement gaps so that none of them occur during a period of time in which the device's serving cell transmits its own positioning reference signal.

Particularly when the base station is restricted in this way, the base station may not always be able to configure a measurement gap to occur during a period of time in which a neighboring cell transmits a positioning reference signal. Thus, the base station may advantageously configure a measurement gap so that a measurement can be performed on another type of signal. That is, for at least one non-serving frequency indicated by the obtained information, the base station may configure a measurement gap to occur during a period of time in which a neighboring cell transmits a signal other than a positioning reference signal over that non-serving frequency. While the base station may unconditionally configure a measurement gap with respect to a non-positioning reference signal in this way, the base station in at least some embodiments does so only to the extent that configuring a measurement gap with respect to a positioning reference signal is not possible.

Embodiments herein also include a wireless device and network node configured in accordance with the above, as well as corresponding methods.

One or more other embodiments herein provide improved methods and devices for supporting configuration of a measurement gap pattern for a user equipment requiring measurement gaps for performing an inter-frequency measurement for positioning.

For example, a first one of these embodiments provides a method in a radio network node of a wireless communication system of supporting configuration of a measurement gap pattern for a user equipment requiring measurement gaps for performing an inter-frequency measurement for positioning. The method comprises receiving, from the user equipment, an indication that the user equipment is going to perform an interfrequency measurement for positioning and that the inter-frequency measurement requires measurement gaps.

A second one of these embodiments provides a radio network node of a wireless communication system. The radio network node is configured for signal interaction with a user equipment requiring configuration of a measurement gap pattern for performing an inter-frequency measurement for positioning. The radio network node comprises a receiver configured to receive, from the user equipment, an indication that the user equipment is going to perform an inter-frequency measurement for positioning and that the inter-frequency measurement requires measurement gaps.

A third one of these embodiments provides a method in a user equipment of a wireless communication system of supporting configuration of a measurement gap pattern for an inter-frequency measurement for positioning performed by the user equipment. The method comprises receiving an indication that the user equipment is requested to start an inter-frequency measurement for positioning for which the user equipment requires measurement gaps. The method also comprises transmitting, to a radio network node, an indication that the user equipment is going to perform an inter-frequency measurement for positioning and that the interfrequency measurement requires measurement gaps.

A fourth one of these embodiments provides a user equipment for use in a wireless communication system. The user equipment is configured for signal interaction with a radio network node. The user equipment comprises a receiver configured to receive an indication that the user equipment is requested to start an inter-frequency measurement for positioning for which the user equipment requires measurement gaps. The user equipment also comprises a transmitter configured to transmit, to a radio network node, an indication that the user equipment is going to perform an inter-frequency measurement for positioning and that the UE requires measurement gaps for the inter-frequency measurement.

An advantage of some of these embodiments is that by informing a radio network node that a UE is going to perform an inter-frequency measurement for positioning for which the UE requires measurement gaps, the radio network node is able to configure an appropriate measurement gap pattern for the UE. If the radio network node is not aware of when the UE is going to perform an inter-frequency measurement for positioning for which the UE requires measurement gaps, the radio network node may be required to always configure UEs for a measurement gap pattern to accommodate inter-frequency measurements for positioning, even when the UEs measure only on intra-frequency cells. This is a severe restriction on the network in that it reduces the amount of radio resources available for intra-frequency measurements and it leads to inefficient measurement procedures.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 11 illustrates a data structure for the provideAssistanceData element specified by prior art LTE standards.

FIG. 12 illustrates a data structure for the requestAssistanceData element specified by prior art LTE standards.

FIG. 13 illustrates a data structure for the OTDOA-ProvideAssistanceData element specified by prior art LTE standards.

FIG. 14 illustrates a data structure for the prs-SubframeOffset element proposed for LTE standards according to one or more embodiments.

FIG. 15 illustrates a data structure for the UL-DCCH-Message proposed for LTE standards according to one or more embodiments.

FIG. 16 illustrates a data structure for the InterFreqRSTD-MeasurementIndication-r10 element proposed for LTE standards according to one or more embodiments.

DETAILED DESCRIPTION

Figure 2:
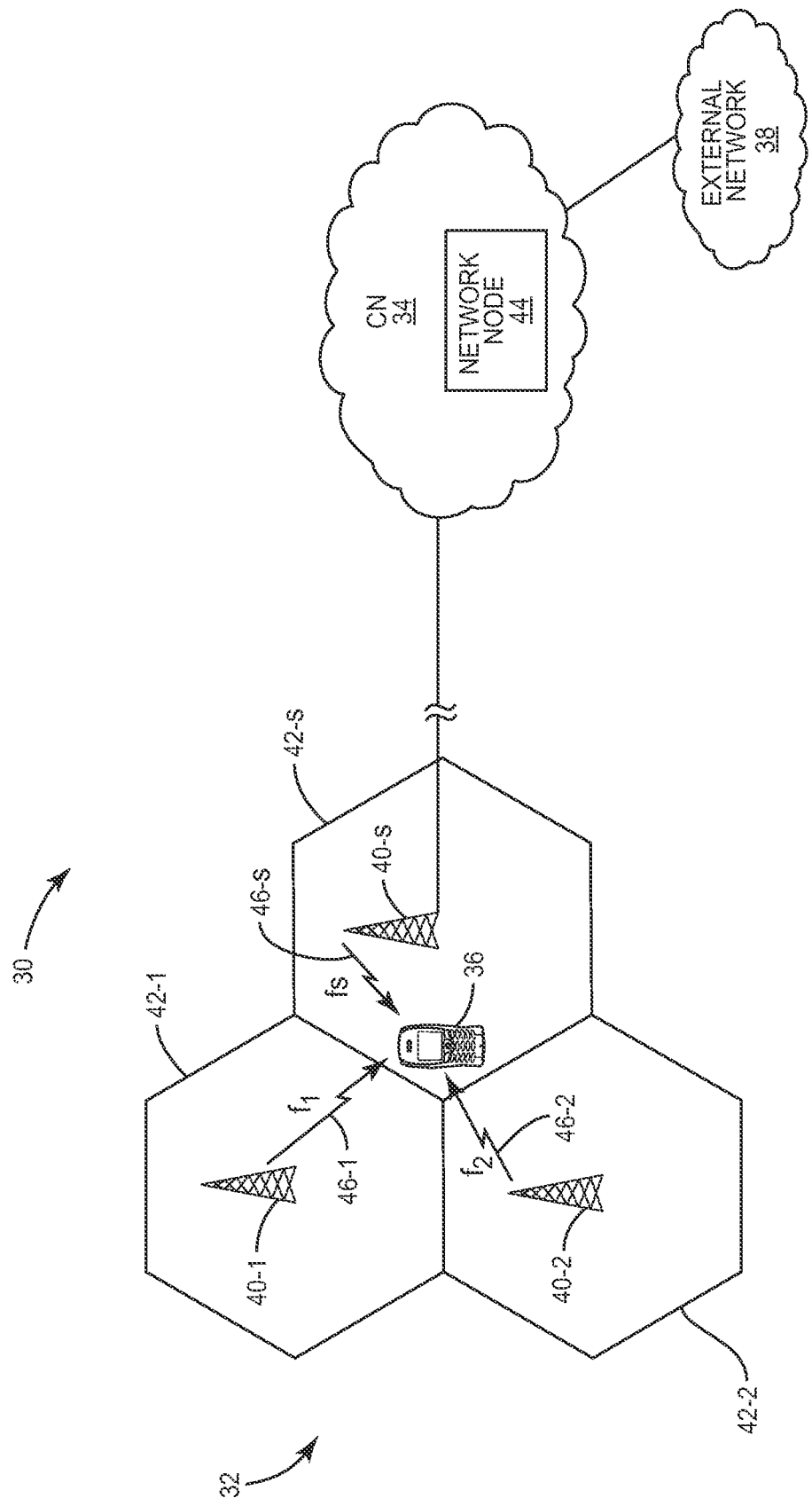
FIG. 2 is a block diagram of a wireless communication system that includes a base station, wireless device, and network node configured according to one or more embodiments.

FIG. 2 depicts a simplified example of wireless communication system 30 according to one or more embodiments. As shown, the system 30 includes a Radio Access Network (RAN) 32, a Core Network (CN) 34, and one or more wireless devices 36. The RAN 32 and CN 36 enable a wireless device 36 to access one or more external networks 38, such as the Public Switched Telephone Network (PSTN) or the Internet.

The RAN 32 includes a number of base stations 40 that are geographically distributed across the wide geographic area served by the system 30. Each base station 40 provides radio coverage for one or more respective portions of that geographic area, referred to as cells 42. As shown, for example, base station 40-1 serves wireless devices 36 within cell 42-1, base station 40-2 serves wireless devices 36 within cell 42-2, and so on. Because of this, a wireless device 36 may move within or between cells 42 and may communicate with one or more base stations 40 at any given position.

In this regard, FIG. 2 depicts a particular wireless device 36 that, at its current position, is served by base station 40-$s$. Thus, from the perspective of this wireless device 36, base station 40-$s$ is the serving base station and cell 42-$s$ is the serving cell. The other cells 42-1 and 42-2 physically neighbor the serving cell 42-$s$ in the sense that they are geographically adjacent to the serving cell 42-$s$. These cells 42-1 and 42-2 are thus appropriately referred to as neighboring cells.

Each of the cells 42 (via its base station 40) periodically transmits a so-called positioning reference signal 46. A positioning reference signal 46 as used herein is specifically designed (e.g., with good signal quality) to be a signal on which a wireless device performs positioning measurements. These positioning measurements are to be used by the terminal itself, or some other network node 44 in the core network 35 (e.g., a positioning node), for determining the device's geographic position. In some embodiments, for example, such positioning measurements comprise timing measurements. In such a case, a wireless device may measure timing differences (e.g., RSTD, Rx–Tx, or TA) between different positioning reference signals 46 received from different cells 42. These timing differences are then used to estimate the device's position with respect to the different cells 42.

Regardless of the particular type of positioning measurements performed on the positioning reference signals 46, at least some of the cells 42 transmit those signals on different frequencies. As shown, for example, the serving cell 42-$s$ transmits its positioning reference signal 46-$s$ on a serving frequency $f_s$, while each of the neighboring cells 42-1 and 42-2 transmits its positioning reference signal 46-1, 46-2 on a respective non-serving frequency $f_1$, $f_2$. In at least some embodiments, these non-serving frequencies $f_1$ and $f_2$ are not the same, i.e., $f_1 \neq f_2$. In this case, the positioning measurements may be performed on one or more non-serving frequencies $f_1$, $f_2$ selected from at least two different possible non-serving frequencies $f_1$, $f_2$.

The wireless device 36 performs positioning measurements on non-serving frequencies $f_1$, $f_2$ during so-called measurement gaps. A measurement gap as used herein refers to a period of time in which the wireless device 36 performs a measurement on a non-serving frequency, and does not transmit any data or otherwise communicate with the serving cell or other cell on the serving-cell frequency.

To this end, the serving base station 40-$s$ configures (i.e., times or otherwise schedules) one or more measurement gaps during which the wireless device 36 is to perform one or more positioning measurements on one or more non-serving frequencies $f_1$, $f_2$. Notably, the base station 40-$s$ does so intelligently, based on information obtained regarding the one or more non-serving frequencies $f_1$, $f_2$ (also referred to below as "non-serving frequency information" or "enhanced measurement gap-related information, EMGRI).

Figure 3:
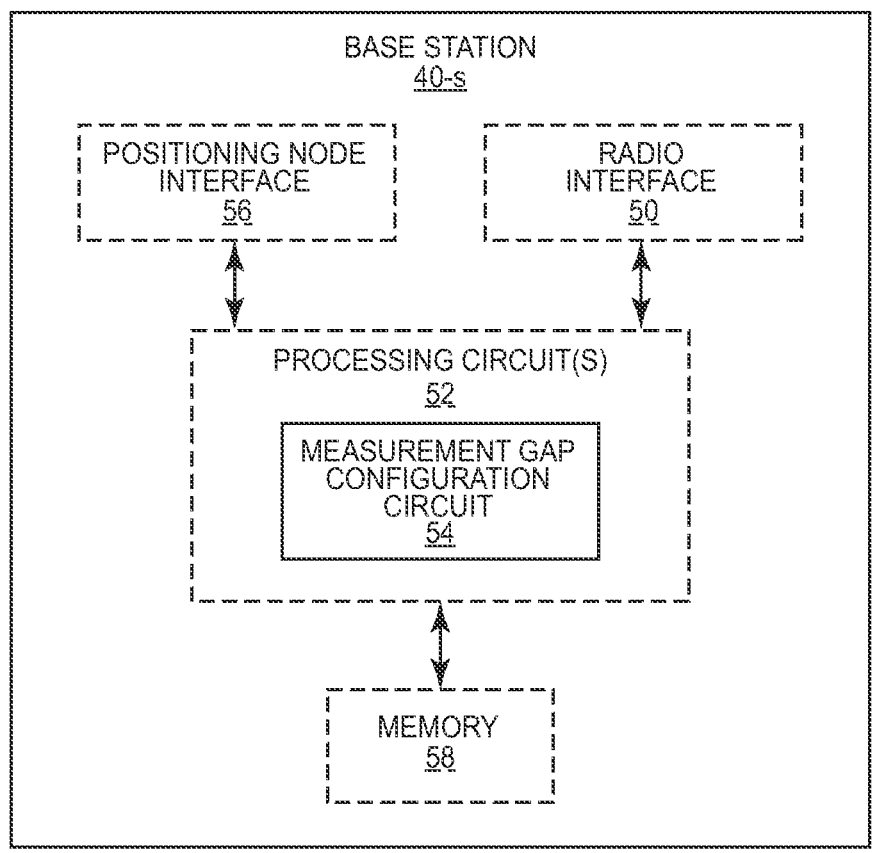
FIG. 3 is a block diagram of a base station configured according to one or more embodiments.

FIG. 3 illustrates additional details of the serving base station 40-$s$ in this regard. As shown in FIG. 3, the base station 40-$s$ includes a radio interface 50 and one or more processing circuits 52. The radio interface 50 is configured to wirelessly communicate with the wireless device 36 over radio resources. The one or more processing circuits 52 include a measurement gap configuration circuit 54.

The measurement gap configuration circuit 54 is configured to obtain the above mentioned information regarding the one or more non-serving frequencies $f_1$, $f_2$. This information more particularly indicates one or more non-serving frequencies $f_1$, $f_2$ on which the wireless device 36 is to perform one or more positioning measurements that are to be used for determining the wireless device's geographic position. For at least one non-serving frequency $f_1$, $f_2$ indicated by the information, the measurement gap configuration circuit 54 configures a measurement gap during which the wireless device 36 is to perform a corresponding positioning measurement. Specifically, the measurement gap configuration circuit 54 configures such measurement gap to occur during a period of time in which a neighboring cell 42-1, 42-2 transmits a positioning reference signal 46-1, 46-2 over that non-serving frequency $f_1$, $f_2$. In this way, the measurement gap configuration circuit 54 intelligently aligns the configured measurement gaps with the occurrence of positioning reference signals from neighboring cells 42-1, 42-2. So aligned, the device's positioning measurements prove more reliable and accurate.

In at least some embodiments, the information obtained by the measurement gap configuration circuit 54 only indicates the one or more non-serving frequencies $f_1$, $f_2$ on which the wireless device 36 is to perform the one or more positioning measurements. In such case, the base station 40-$s$ is pre-configured with neighbor cell information that indicates which cells 42 neighbor the serving cell 42-$s$, which frequencies those neighboring cells 42 use, and the periods of time during which those neighboring cells 42 transmit positioning reference signals 46. When the measurement gap configuration circuit 54 obtains information about the non-serving frequencies $f_1$, $f_2$ on which the positioning measurements are to be performed, it determines, estimates, or otherwise derives from the neighbor cell information the periods of time during which positioning reference signals 46 will be transmitted by neighboring cells 42 over the indicated non-serving frequencies $f_1$, $f_2$. The measurement gap configuration circuit 54 then configures measurement gaps to occur during those periods of time.

Of course, the information obtained by the measurement gap configuration circuit 54 may also indicate some or all of such neighbor cell information as it relates to the positioning measurements. In some embodiments, for instance, the information also identifies at least one neighboring cell 42-1, 42-2 on which the wireless device 36 is to perform the one or more positioning measurements. That is, unlike embodiments where only the non-serving frequencies $f_1$, $f_2$ are indicated, the information actually distinguishes the neighboring cell(s) 42 on which the measurements will be performed. So distinguished, the information more particularly assists the measurement gap configuration circuit 54 determine the periods of time during which positioning reference signals 46 will be transmitted over the indicated non-serving frequencies $f_1$, $f_2$.

Note that, in at least some embodiments, neighboring cells 42 that transmit positioning reference signals 46 over the same non-serving frequency transmit those signals 46 during the same period of time. In this case, the information obtained by the measurement gap configuration circuit 54 may only identify a single neighboring cell 42 for each non-serving frequency on which the device 36 will perform a positioning measurement, even if more than one neighboring cell 42 will actually transmit a positioning reference signal 46 on that non-serving frequency. A single cell identity suffices because, in these embodiments, once the measurement gap configuration circuit 54 configures a measurement gap for performing a positioning measurement, the wireless device 36 will perform a positioning measurement on each different positioning reference signal 46 transmitted during the measurement gap.

In other embodiments, the information obtained by the measurement gap configuration circuit 54 also actually indicates the periods of time during which one or more neighboring cells 42-1, 42-2 will transmit respective positioning reference signals 46-1, 46-2 on the indicated non-serving frequencies $f_2$. For example, in at least one embodiment, the information indicates the period of time during which any given neighboring cell 42-1, 42-2 transmits its positioning reference signal 46-1, 46-2 as an offset from the period of time during which the serving cell 42-s transmits its positioning reference signal 46-s. As explained in more detail below, such an offset may be a subframe offset.

Of course, the offset may be indicated by other methods as well. As another example, the offset may be indicated with respect to the period of time during which a so-called reference cell 42 (not indicated) transmits its positioning reference signal 46. The reference cell 42 may be any of the neighboring cells 42-1, 42-2, or even the serving cell 42-s. Regardless, positioning measurements performed on the positioning reference signal 46 transmitted by such a reference cell 42 serve as a reference for positioning measurements performed on positioning reference signals 46 transmitted by other cells 42.

In at least one other embodiment, the information indicates the period of time during which any given neighboring cell 42-1, 42-2 transmits its positioning reference signal 46-1, 46-2 by indicating that the neighboring cell 42-1, 42-2 employs one of a plurality of different pre-defined positioning reference signal configurations. These different positioning reference signal configurations specify different periodicities and different timing offsets at which positioning reference signals are transmitted from a cell 42, and may be identified with different configuration indices. In the LTE context, explained in more detail below, such a configuration index may comprise a PRS configuration as defined in 3GPP TS 36.211.

Regardless of the particular information indicated in addition to the non-serving frequencies $f_1$, $f_2$, in some embodiments the measurement gap configuration circuit 54 is somewhat restricted in the sense that it must configure the measurement gaps according to one or more pre-defined rules. For example, in one embodiment, the measurement gap configuration circuit 54 must configure the measurement gaps so none of them occur during a period of time in which the device's serving cell 42-s transmits its own positioning reference signal 46-s. Alternatively or additionally, the measurement gap configuration circuit 54 must configure the measurement gaps using a particular gap pattern. Such pre-defined rules may ensure that the device 36 can perform a positioning measurement on the serving frequency $f_s$, without that measurement conflicting with other positioning measurements performed on non-serving frequencies $f_1$, $f_2$.

Particularly when the measurement gap configuration circuit 54 is restricted by such rules, and perhaps for other reasons, the circuit 34 may not always be able to configure a measurement gap for performing a positioning measurement on a particular non-serving frequency to occur during a period of time in which a neighboring cell 42 transmits a positioning reference signal 46. As noted above, this is unfortunate because measurements performed on positioning reference signals prove more reliable and accurate than measurements performed on other signals. Nonetheless, the measurement gap configuration circuit 54 may advantageously configure a measurement gap so that a measurement can be performed on another type of signal. That is, for at least one non-serving frequency indicated by the obtained information, the circuit 24 may configure a measurement gap during which the wireless device 36 is to perform a positioning measurement to occur during a period of time in which a neighboring cell transmits a signal other than a positioning reference signal 46 over that non-serving frequency.

Note that, in some embodiments, the measurement gap configuration circuit 54 unconditionally configures a measurement gap during which the wireless device 36 is to perform a positioning measurement to occur during a period of time in which a neighboring cell transmits a signal other than a positioning reference signal 46 over a non-serving frequency. In other embodiments, though, the measurement gap configuration circuit 54 does so only if the measurement gap cannot be configured to occur during a period of time in which the neighboring cell transmits a positioning reference signal 46 over that non-serving frequency.

There are a number of different types of signals that may suit for performing positioning measurements on, in case the measurements cannot be performed on positioning reference signals. One type includes cell-specific reference signals (CRS). Other types include terminal-specific reference signals, synchronization signals, pilot signals, or the like. These signals may advantageously be transmitted more often, and may therefore be more available, than positioning reference signals. However, the signals may still be transmitted and available for measurement at time occasions not known to the wireless device, e.g., when the neighbour cell timing is not known to the UE, or when the measurements are to be performed in certain patterns (such as restricted measurement patterns for eICIC). Information about when neighboring cells 42 transmit these non-positioning reference signals may be obtained by the measurement gap configuration circuit 54 in much the same way as discussed above with respect to the positioning reference signals 46.

The measurement gap configuration circuit 54 may obtain the information indicating one or more non-serving frequencies $f_1$, $f_2$ on which the wireless device 36 is to perform one or more positioning measurements via any number of ways. In some embodiments, for example, the measurement gap configuration circuit 54 receives at least some of the information from the wireless device 36, e.g., via radio interface 52. In one such approach, the circuit 54 receives at least some of the information within a measurement gap request from the wireless device 36. This measurement gap request requests the base station 40-*s* to configure one or more measurement gaps during which the wireless device 36 is to perform the one or more positioning measurements on the one or more non-serving frequencies $f_1$, $f_2$. Responsive to the request, the base station 40-*s* configures the requested measurement gaps as described above and responds with information identifying when those gaps have been configured to occur. In LTE embodiments, the device 36 sends the request to the base station 40-*s*, and the base station 40-*s* responds, using a higher layer signaling protocol, e.g., Radio Resource Control (RRC).

In another approach, the measurement gap configuration circuit 54 receives the measurement gap request from the wireless device 36 and, responsive thereto, sends a request to the device 36 for at least some of the non-serving frequency information. Thus, rather than the wireless device 36 proactively sending the base station 40-*s* the information within the measurement gap request, the device 36 waits until the base station 40-*s* actually solicits the information. The base station's request for the information may indicate what type of information is being requested, e.g., the non-serving frequencies, neighboring cells identifies, etc. on which the positioning measurements are to be performed. And, like the previous approach, the base station's request and the device's response may be transmitted using a higher layer signaling protocol.

In other embodiments, the measurement gap configuration circuit 54 receives at least some of the information from the network node 44, e.g., via a network node interface 56. In at least one embodiment, for example, the circuit 54 receives such information from the network node 44 in response to the base station 40-*s* requesting that information. The base station 40-*s* may request the information when it receives the measurement gap request from the wireless device 36. The information request may include, among other things, the device's identity, a transaction identity, an identity for a positioning session between the device 36 and the network node 44, the type of positioning measurements to be performed, and the like. The information request may also explicitly identify the device's serving cell 42-*s*, so that the network node 44 can determine the non-serving frequencies on which the measurements may be performed. Alternatively, the network node 44 may implicitly derive or otherwise acquire the serving cell identity based on, for example, information about the base station 40-*s* that transmitted the information request or information about how the request was routed to the network node 44.

In at least one other embodiment, the measurement gap configuration circuit 54 receives at least some of the information from the network node 44 without having to request that information. In some cases, for example, the wireless device 36 sends a request to the network node 44 requesting measurement gaps. This measurement gap request may likewise contain, among other things, the device's identity, a transaction identity, an identity for a positioning session between the device 36 and the network node 44, the type of positioning measurements to be performed, and the like. The request may also identify the serving cell 42-*s*. Regardless, responsive to receiving this request, the network node 44 proactively sends the base station 40-*s* at least some of the non-serving frequency information that the base station 40-*s* will ultimately need in configuring the measurement gaps as described above. In other cases, the network node 44 may wait to send this information to the base station 40-*s* until the node 44 sends the wireless device 36 assistance data for performing the one or more positioning measurements. In any of these cases, the information may be sent via LPPa or LPPe in LTE embodiments.

Figure 4:
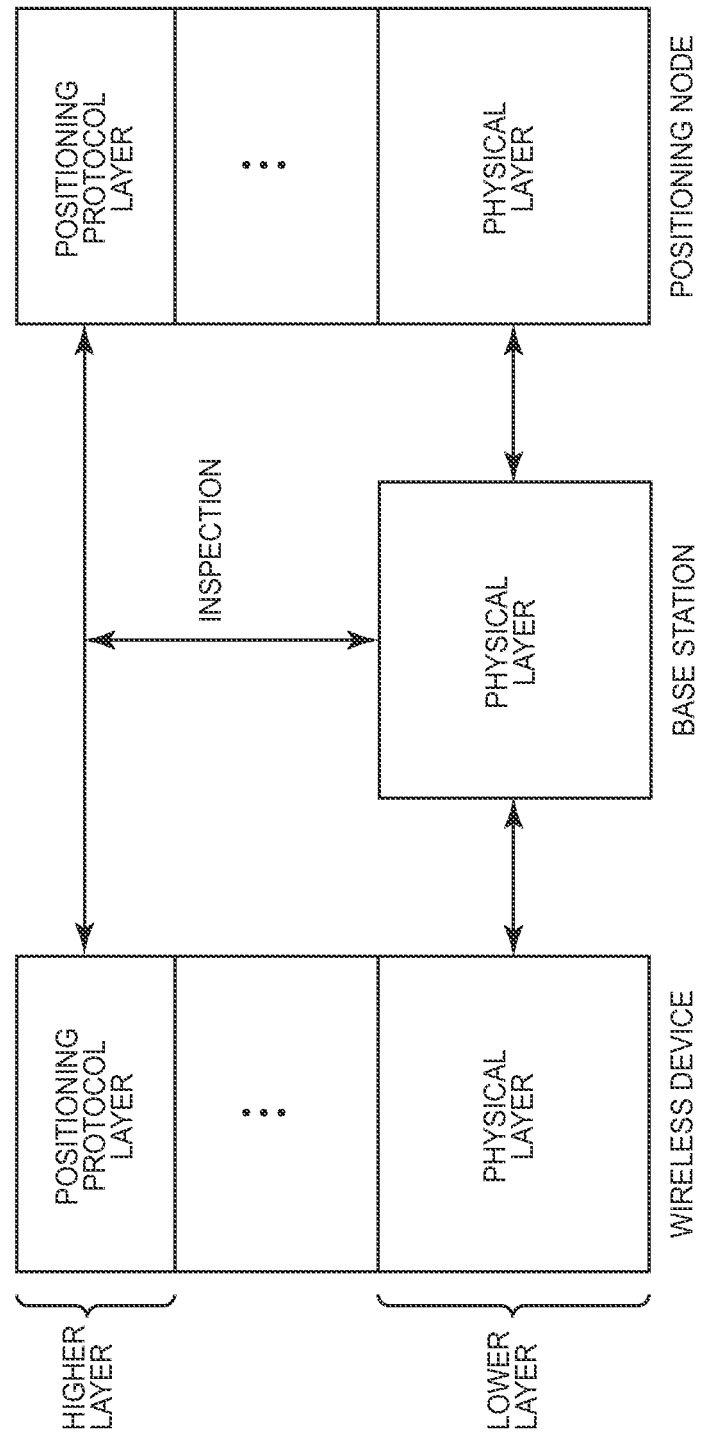
FIG. 4 depicts cross-layer inspection performed by a base station according to one or more embodiments.
Figure 5:
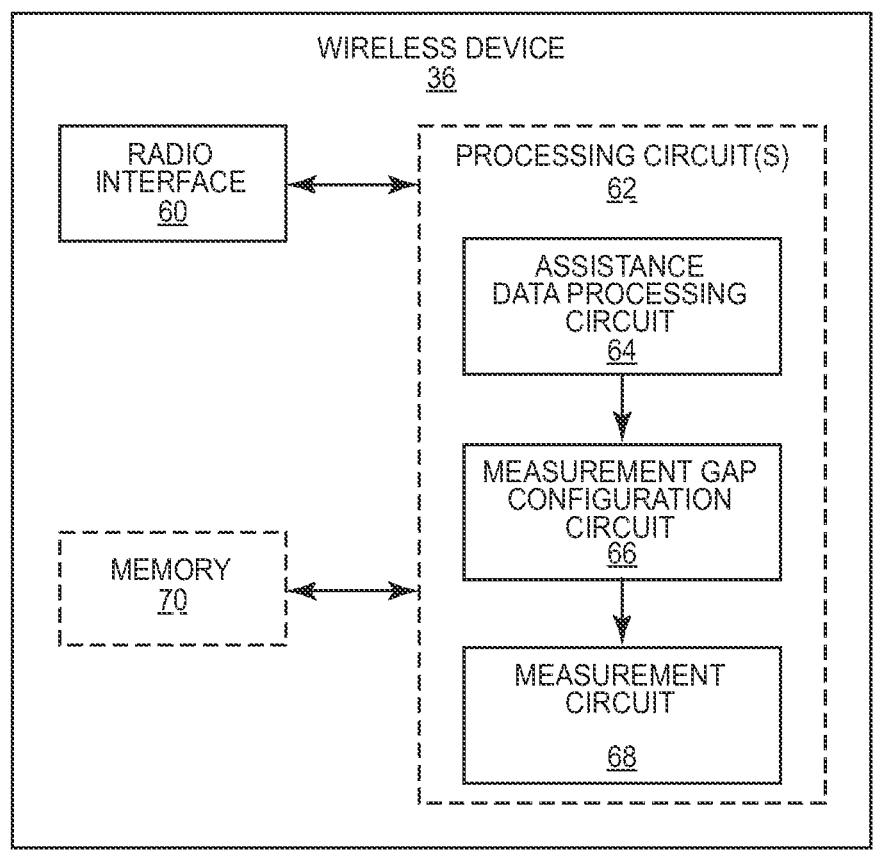
FIG. 5 is a block diagram of a wireless device configured according to one or more embodiments.

While in the above embodiments the measurement gap configuration circuit 54 received information from the wireless device 36 or network node 44 via explicit control signaling, in other embodiments the circuit 54 receives such information by inspecting or otherwise "sniffing" higher layer communications transmitted between the device 36 and network node 44. FIG. 4 illustrates these so-called "cross layer" embodiments in more detail. As shown in FIG. 4, the base station 40-*s*, wireless device 36, and network node 44 each implement a protocol stack. The wireless device 36 and network node 44 communicate at a higher layer of their protocol stacks called a positioning protocol layer (such as LPP in LTE embodiments). The base station 40-*s* communicates with each of the wireless device 36 and the network node 44 at a lower layer of the protocol stacks, referred to generally as a physical layer. Through these lower layer communications, the base station 40-*s* transparently forwards or relays the higher layer communications between the wireless device 36 and the network node 44.

Nonetheless, according to advantageous embodiments herein, the base station 40-*s* inspects the higher layer communications as it is forwarding them between the wireless device 36 and network node 44. These higher layer communications may contain, for instance, assistance data being transmitted from the network node 44 to the wireless device 36. Accordingly, through cross-layer inspection of this assistance data, the base station 40-*s* obtains or extracts at least some of the non-serving frequency information.

In yet other embodiments, the measurement gap configuration circuit 54 receives at least some of the information from other network nodes, e.g., an operation and maintenance node, or a self organizing network node. In still other embodiments, the circuit 54 receives at least some of the information from a database stored internally at the base station 40-*s* in memory 58, or stored externally in another node.

Figure 23:
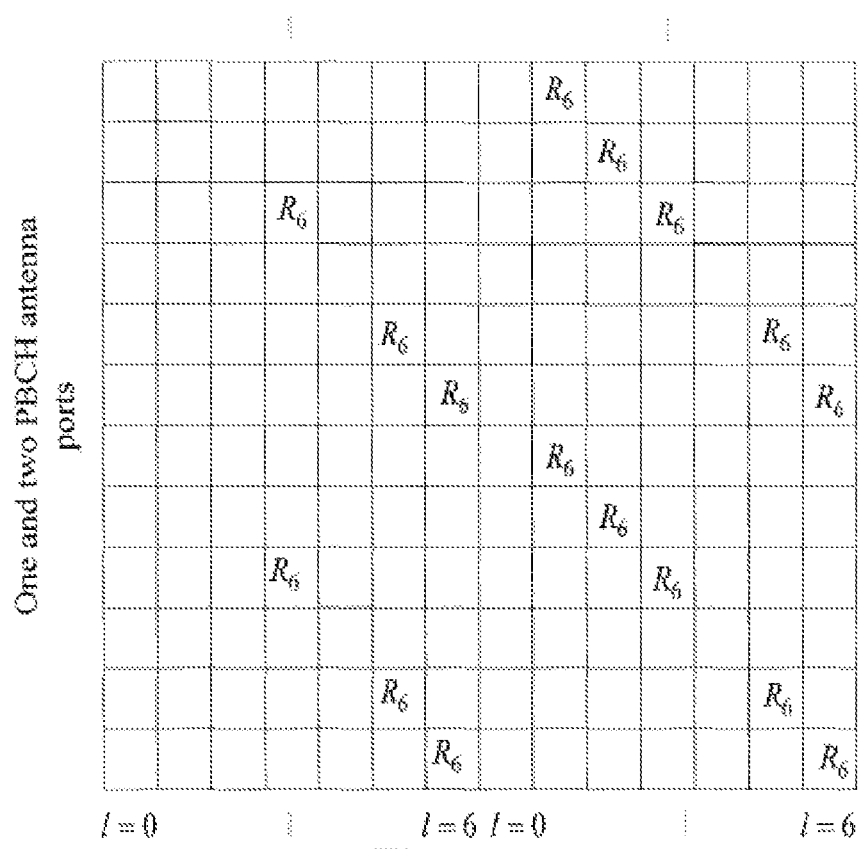
FIG. 23 is a schematic block diagram illustrating a Positioning Reference Signal pattern when one or two antennas are used for a Physical Broadcast Channel (PBCH).

FIG. 23 now illustrates additional details of the wireless device 36 in accordance with the above described embodiments. As shown in FIG. 23, the device 36 includes a radio interface 60 and one or more processing circuits 62. The radio interface is configured to wirelessly communicate with the base station 40-*s* over radio resources. The one or more processing circuits 62 include an assistance data processing circuit 64, a measurement gap configuration circuit 66, and a measurement circuit 68.

The assistance data processing circuit 64 is configured to receive assistance data from the network node 44, via the radio interface 60. The assistance data processing circuit 64 is further configured to interpret or otherwise recognize the assistance data as being associated with one or more positioning measurements for which the device 36 is to request measurement gaps; that is, positioning measurements that are to be performed on one or more non-serving frequencies $f_1$, $f_2$. In this regard, the assistance data includes information that indicates such non-serving frequencies.

The measurement gap configuration circuit 66 is configured to transmit a measurement gap request to the base station 40-*s*, via the radio interface 60. This measurement gap request requests the base station 40-s to configure one or more measurement gaps during which the wireless device 36 is to perform the one or more positioning measurements. In conjunction with transmitting the measurement gap request, the measurement gap configuration circuit 66 is configured to also transmit information to the base station 40-s that indicates the one or more non-serving frequencies $f_1$, $f_2$ on which the wireless device 36 is to perform the one or more positioning measurements. In some embodiments, for example, the measurement gap configuration circuit 66 includes such information in the measurement gap request itself.

Note that the measurement gap configuration circuit 66 may receive assistance data related to this information from a network node, so that the circuit 66 can in turn send such information to the base station 40-s in conjunction with a measurement gap request. However, in some embodiments, the measurement gap configuration circuit 66 receives assistance data associated with a greater number inter-frequencies than that for which it requests measurement gaps. In this case, the measurement gap configuration circuit 66 intelligently selects a subset of cells or frequencies for which measurement gaps are to be requested.

For example, some wireless devices 36 (such as those capable of carrier-aggregation) may be able to perform inter-frequency measurements on at least some of the frequencies for which it received assistance data without having to request measurement gaps. In this case, the device's measurement gap configuration circuit 66 is configured to refrain from requesting measurement gaps for those frequencies, and may therefore only request measurement gaps for a subset of frequencies. As another example, if measurements on all frequencies for which the device 36 received assistance data are not possible, the measurement gap configuration circuit 66 may select and request measurement gaps for only a subset of those frequencies. Additionally or alternatively, the measurement gap configuration circuit 66 may select frequencies on which PRS occasions may be covered by the same gap pattern, etc.

Regardless, as in embodiments described previously, the information transmitted to the base station 40-s may further identify at least one neighbor cell 42 on which the measurements will be performed, the periods of time in which those cells 42 transmit positioning reference signals 46, or the like.

The measurement gap configuration circuit 66 is also configured to receive a response from the base station 40-s. Such response includes information identifying when the one or more measurement gaps have been configured to occur. Correspondingly, the measurement circuit 68 is configured to perform the one or more positioning measurements on the one or more non-serving frequencies $f_1$, $f_2$ during the one or more configured measurement gaps indicated by the response, using the received assistance data. In doing so, the measurement circuit 68 is configured to perform (i.e., time) at least one positioning measurement by measuring a positioning reference signal 46-1, 46-2 transmitted from a neighboring cell 42-1, 42-2 during a corresponding measurement gap using a corresponding non-serving frequency $f_1$, $f_2$.

Figure 17:
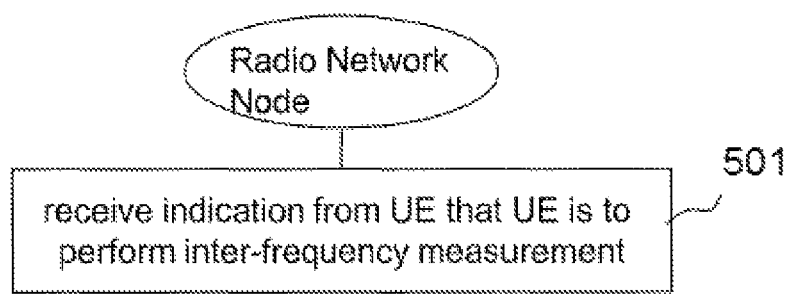
FIG. 17 is a flow diagram illustrating an exemplary embodiment of a method in a radio network node for supporting configuration of a measurement gap pattern for a UE requiring measurement gaps for performing an inter-frequency measurement.

FIG. 17 illustrates additional details of a network node 44 (e.g., a positioning node) in accordance with the above described embodiments. As shown in FIG. 17, the network node 44 includes a network interface 72 and one or more processing circuits 74. The network interface 72 is configured to communicatively couple the network node 44 to the base station 40-s (e.g., via lower layer protocols) and the wireless device 36 (e.g., via higher layer protocols). The one or more processing circuits 74 include an assistance data controller 76 and a positioning measurement controller 78.

The assistance data controller 76 is configured to obtain assistance data for assisting the wireless device 36 to perform one or more positioning measurements. The assistance data controller 76 may do so, for example, responsive to receiving a request from the wireless device 36 for its position. Regardless, the obtained assistance data includes information that indicates one or more non-serving frequencies $f_1$, $f_2$ on which the wireless device 36 is to perform the one or more positioning measurements. Having obtained this assistance data, the assistance data controller 76 is configured to send the assistance data to the wireless device 36 and a request that the wireless device 36 perform the one or more positioning measurements. Notably, the assistance data controller 76 is further configured to send to the device's serving base station 40-s the information indicating the one or more non-serving frequencies $f_1$, $f_2$ on which the wireless device 36 is to perform the one or more positioning measurements. This way, the base station 40-s will be able to configure measurement gaps for the device 36 as described above.

Note that in at least some embodiments the network node 44 intelligently requests the wireless device 36 to perform positioning measurements on non-serving frequencies based on the serving base station's ability to configure measurement gaps for such measurements. By requesting the wireless device 36 to perform positioning measurements based on the base station's ability to accommodate those measurements with measurement gaps, the network node 44 advantageously mitigates the possibility that requested positioning measurements will fail.

Specifically, the positioning measurement controller 78 in these embodiments is configured to obtain information that indicates whether or not the base station 40-s is capable of configuring one or more measurement gaps during which the wireless device 36 can perform one or more positioning measurements on one or more non-serving frequencies $f_1$, $f_2$. If the base station 40-s is capable, the positioning measurement controller 78 sends a request to the wireless device 36 requesting that the wireless device 36 perform the one or more positioning measurements with respect to at least one neighboring cell 42-1, 42-2. Otherwise if the base station 40-s is not capable, the positioning measurement controller 78 either refrains from sending such a request, or determines different non-serving frequencies on which to perform positioning measurements.

While the above description has generally referred to the positioning measurements as being performed on one or more non-serving frequencies, those skilled in the art will appreciate that such positioning measurements may encompass more than just those measurements conventionally referred to as "inter-frequency" measurements. Indeed, inter-frequency measurements typically connote measurements performed on signals that are transmitted at a frequency different than a serving frequency, but with the same radio access technology (RAT) as the serving RAT and/or within the same frequency band as the serving band. Of course, different RATs and different frequency bands operate on different frequencies, meaning that positioning measurements performed on one or more non-serving frequencies encompass not only inter-frequency measurements, but also inter-RAT and inter-band measurements.

In this regard, note that the information obtained by the wireless device 36 may actually indicate one or more non-serving RATs on which the wireless device 36 is to perform the one or more positioning measurements. More particularly, the wireless device 36 may receive such information via at least one of a higher-layer protocol extension (e.g., LPPe) and user plane communications (e.g., SUPL). Moreover, the wireless device 36 may receive such information in conjunction with a request for the wireless device 36 to use the information to perform the positioning measurements on one or more neighboring cells 42-1, 42-2 that implement the one or more non-serving RATs.

Those skilled in the art will also appreciate that, in various ones of the embodiments above, different neighboring cells 42-1, 42-3 are configured to transmit positioning reference signals 46-1, 46-2 during different time periods (in the sense that, although the periods may overlap, they are not identical), despite transmitting those signals 46-1, 46-2 using the same non-serving frequency. In other embodiments, the wireless communication system 30 includes three or more neighboring cells 42 that transmit positioning reference signals 46 on different non-serving frequencies. Regardless, in these embodiments, the base station 40-s discussed above advantageously receives explicit assistance data related to the non-serving frequencies, since the base station 40-s could not indirectly deduce or otherwise derive such data.

Those skilled in the art will further appreciate that the wireless device 36 described herein may be any wireless node capable of performing positioning measurements on positioning reference signals 46. In this regard, the device 36 may be a mobile terminal (e.g., a smart phone, a personal digital assistant, a laptop, etc.), a sensor, a mobile relay, or even a small base station or fixed relay that is being positioned, e.g., at setup. In LTE embodiments, for instance, the device 36 comprises any LCS target.

Moreover, the device 36 need not necessarily require measurement gaps in order to perform positioning measurements on non-serving frequencies. Indeed, standardized operation of the device 36 may dictate that measurement gaps be configured for such positioning measurements, even if the device 36 is technically capable of performing the measurements without them. One such device 36 may be, for instance, a device capable of carrier aggregation.

Further, those skilled in the art will appreciate that the various "circuits" described may refer to a combination of analog and digital circuits, and/or one or more processors configured with software stored in memory 58, 70, 80 and/or firmware stored in memory 58, 70, 80 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Still further, the above embodiments have not been described in the context of any particular type of wireless communication system (i.e., RAT). In this regard, no particular communication interface standard is necessary for practicing the present invention. That is, the wireless communication system 30 may be any one of a number of standardized system implementations that configure measurement gaps during which a wireless device 36 can perform positioning measurements on non-serving frequencies.

Nonetheless, as one particular example, the system 30 may implement LTE or LTE-based standards. In this case, the wireless device 36 may comprise a User Equipment (UE), and the base station 40 may comprise an eNodeB. Likewise, the network node 44 may comprise a positioning node that implements a positioning platform. If the platform is implemented in the user plane, the network node 44 is an SLP node, and if the platform is implemented in the control plane, the node 44 is an E-SMLC node. Moreover, signaling of the positioning result between an E-SMLC node and an LCS Client may be transferred via multiple nodes (e.g., via MME and GMLC). Note also that LTE FDD and LTE TDD are considered as different RATs, and two LTE networks are also considered as two different LTE RATs. Finally, positioning reference signals 46 as referred to above comprise Positioning Reference Signals (PRS) in LTE.

An eNodeB according to current LTE standards receives a request for inter-frequency measurement gaps but is not aware of the carrier frequency on which those measurements will be performed. Despite this, the current OTDOA RSTD inter-frequency requirements specify that "there are no measurement gaps overlapping with the PRS subframes in cells belonging to the serving carrier frequency." 3GPP TS 36.133 v.10.1.0 and v.9.6.0, Section 9.1.10.2. This is problematic because the currently standardized measurement gap periodicity is a multiple of 40 ms (40 ms and 80 ms, but only 40 ms may be configured for inter-frequency RSTD, as specified in 3GPP TS 36.133). Moreover, the periodicity of PRS positioning occasions is also a multiple of 40 ms. This means that, in order to comply with the current OTDOA RSTD inter-frequency requirements and avoid overlap of the gaps with the serving cell PRS, PRS positioning occasions on non-serving cells have to be misplaced with respect to the serving cell. This in turn means that PRS positioning occasions are likely to be non-overlapping on any two frequencies in a system.

In a two-frequency system, the serving eNodeB, which configures measurement gaps, knows the serving frequency of the UE and thus knows the other frequency. If on the other frequency all cells are using overlapping PRS positioning occasions, then the eNodeB may deduce when in time measurement gaps for that frequency have to be configured. A problem, however, occurs when PRS occasions are misaligned in some cells on the same frequency or more than two frequencies are used for inter-frequency measurements (e.g. there is at least one cell using PRS on each frequency).

To address this problem, more information (referred to as enhanced measurement gap-related information, or EMGRI) may be provided to or acquired by the eNodeB so that the eNodeB can overlap a configured measurement gap with a PRS positioning occasion on a non-serving frequency measured by the UE. EMGRI indicates the one or more non-serving frequencies on which inter-frequency positioning measurements are to be performed. EMGRI may also include the RAT in which positioning measurements in the requested measurement gaps are to be performed, at least one cell ID for which inter-frequency positioning measurements are to be performed, one or more preferred measurement gap configurations, and/or reference cell identification information from the positioning assistance data. EMGRI may even include additional information, including one or more of offsets (one per inter-frequency cell) between positioning occasions of inter-frequency cells and the reference or serving cell, one or more System Frame Number (SFN) offsets, positioning reference signal (PRS) subframe offset, and/or one or more PRS configurations.

With regard to the EMGRI including at least one cell ID, the EMGRI may include only a single cell ID. This may be the case when all cells are on the same non-serving frequency and/or have the same PRS configuration with PRS positioning occasions aligned among the cells. Any cell ID of any cell on this frequency may be selected, e.g., randomly. Or, this may be the case when if the UE selects only one of a plurality of possible inter-frequencies for performing positioning measurements, and correspondingly selects one cell from the selected frequency. In this regard, the UE may select the inter-frequency that has the largest number of cells transmitting on that frequency. In other embodiments, the EMGRI may include more than one cell ID. This may be the case if more than one cell is selected for a single frequency, or if multiple frequencies are selected.

With regard to the EMGRI including one or more preferred measurement gap configurations, such may be indicated as a preferred measurement gap offset. The eNodeB will still have the final decision about which measurement gap configuration to actually use. In this regard, though, the preference may be used to recommend the configuration that would maximize the number of cells that could be measured within the configured measurement gaps. Such would depend on how the PRS are aligned among the cells and upon the cell frequencies.

With regard to the additional information included in the EMGRI, that information may be a part of the EMGRI, or signaled outside the EMGRI. For example, the additional information may be signalled from the positioning node to the eNodeB via LPPa, or exchanged between eNodeB e.g. via X2 or via O&M.

Regardless, with respect to the one or more offsets of this additional information, the offsets may be a subframe offset between the positioning occasions of the inter-frequency cell for which measurement gaps are needed and the reference or serving cell. In another embodiment, the subframe offset is the prs-SubframeOffset, or is derived according the definition of prs-SubframeOffset in 3GPP TS 36.355, where the prs-SubframeOffset is specified in FIG. 14.

With regard to the one or more SFN offsets, there may be one SFN offset per inter-frequency cell. Here, the SFN offset is the offset between the SFN 0 of the inter-frequency cell and the SFN 0 of the reference/serving cell.

With regard to the one or more PRS configurations, there may be one configuration per inter-frequency cell. These configurations include those defined in 3GPP TS 36.211. Further, PRS configurations may also be muted according to a pattern. The muting pattern information may provide additional information on whether the configured PRS signals are actually transmitted or not at certain time occasions, so the obtained periods of time during which a neighbor cell transmits its signals intended for positioning measurements may also account for such muting configuration. Alternatively, muting configuration may be not received in an indication message but may be obtained by some other means (e.g., via O&M or X2 with another radio node) but still be accounted when configured the measurement gaps requested for positioning measurements.

The EMGRI may be acquired by the eNodeB in any number of ways. In one example, the eNodeB maintains a database from which the EMGRI is acquired. The database may be in internal or external memory and may comprise neighbor relation information for cells in the area, e.g. which cells are to be likely inter-frequency cells for positioning measurements for a UE served by the current cell associated with the eNodeB. In one embodiment, the same database may be used by the positioning node. In yet another embodiment, the database is obtained by the eNodeB from the positioning node or other network node (e.g. SON or O&M).

In another example, the eNodeB obtains the EMGRI via RRC signaling. According to one embodiment, the EMGRI may be signaled in an RRC message defined according to 3GPP TS 36.331. The EMGRI may be signalled together with a measurement gap indication. An example RRC message is an UL-DCCH-Message. The UL-DCCH-Message class is the set of RRC messages that may be sent from the UE to the E UTRAN on the uplink DCCH logical channel. See, for example, FIG. 15.

As shown in FIG. 15, interFreqRSTDMeasurementIndication-r10 is a new element introduced in the UL-DCCH-MessageType for the EMGRI. Indeed, in one embodiment, EMGRI is signaled within the new element interFreqRSTDMeasurementIndication-r10, thus replacing the reserved spare7 element.

Alternatively, EMGRI is signaled within another element that will contain the measurement gap indication or start/stop indicators. See, for example, FIG. 16.

Furthermore, the eNodeB when receiving EMGRI, e.g. cell ID(s), may further request (e.g. from a positioning node or another network node or the radio node associated with the cell(s)) additional information that enables the eNodeB to correctly configure measurement gaps, e.g. PRS configuration of at least one cell for which PRS configuration is not known to the eNodeB.

According to yet another example, the eNodeB uses cross layer communication to inspect higher layer protocol packets for the EGMRI. In this embodiment, cross layer communication is used by the eNB to sniff the information sent in LPP, in order to acquire the EMGRI. Specifically, LPP is used for communication between the UE and the E-SMLC. LPP passes transparently over the eNB, and contains assistance data which in turn carries information such as carrier frequency of the inter-frequency RSTD measurement, PRS information etc. Since all assistance data in LPP goes through the eNB, the eNodeB has the means to access higher layer information by inspecting the structure of the transported LPP packets. Once EMGRI information is captured, it can be used as an input for determining the parameters related to the inter-frequency positioning measurements e.g. carrier frequency, measurement gap offset etc. Hence the eNB can configure the measurement gap in an efficient manner. For example, the eNB can configure the measurement gap such that UE does not miss any PRS occasion. The eNB may also be able to ensure that the maximum number of positioning subframes is included in the measurement gap. This will in turn improve the measurement performance of the positioning measurements.

In the future, assistance data may be enhanced with new parameters. This will also widen the scope of EMGRI i.e. new parameters. Notably, the cross layer communication method above can nonetheless ensure that these new parameters are also easily acquired by the eNB by sniffing the LPP.

Of course, in some instances the eNodeB may not be able to align all measurement gaps with PRS signals. In known approaches, if configured measurement gaps do not overlap with PRS positioning occasions, the inter-frequency measurements are likely to fail. Embodiments herein advantageously recognize that, even though PRS have been specifically designed for positioning measurements and in general are characterized by better signal quality than other reference signals, the LTE standard does not mandate using PRS. The embodiments therefore employ other reference signals, e.g. cell-specific reference signals (CRS), for positioning measurements.

Specifically, to prevent measurement failure, when the UE requests measurement gaps for RSTD measurements and the network configures the gaps, the UE performs the measurements on non-serving frequencies/RATs on signals that are different from PRS. The signals may be any signals that are available in the gaps. Either the network can ensure that the signals are available in the gaps, or the signals are transmitted more often than PRS (e.g. the periodicity of these signals is at most as long as the measurement gap length).

Some examples of non-PRS signals in LTE are synchronization signals, cell-specific reference signals (CRS), UE-specific reference signals, or any other reference or physical signals. In the embodiment where the UE performs measurements on UE specific reference signals, these signals may be configured upon receiving such an indication e.g. in one or more of the requested cell (the requested cell identification may be supplied with EMGRI).

Example non-PRS signals in a non-LTE RAT are pilot signals in UMTS or CDMA, any physical signals, etc. Indeed, in one embodiment, a radio base station associated with the serving cell of the UE supports multiple RATs, e.g. multi-standard radio (MSR) base stations supporting GSM, UMTS and LTE. In this case, if an MSR base station receives an indication for measurement gaps for inter-frequency positioning measurements, it may also be aware of the signals transmitted by the same base station in different RATs, and possibly the signals transmitted by other BSs in the same RAT (e.g. in a synchronous network, such as CDMA or GSM). Thus, the base station may use this information when configuring measurement gaps to ensure that the measurement gaps cover the signals to be measured. Note that also any non-MSR radio node may exploit the fact the network on a certain frequency is synchronous or frame-aligned or subframe-aligned, while configuring measurement gaps.

Finally, note that LTE embodiments herein configure and use measurement gaps for measurements beyond those covered by 3GPP TS 36.133. More particularly, in some instances, a multi-frequency situation occurs. The current standard describes two inter-frequency situations, as described in Section 1.1.4.4, covering only cells in the corresponding frequencies received in the OTDOA assistance data. However, with LPPe or user plane positioning protocol (SUPL), assistance data may be further extended to include more cells, which may be on the same frequency as the serving cell or on a different frequency, on the same RAT or a different RAT (e.g. GSM, WCDMA, or CDMA).

According to the current LTE specification, there are no requirements for measurements that involve such cells and there is no standardized way to inform eNodeB about the measurement gaps for such cells. With the measurement gap activation introduced in the standard, the UE has a possibility to request measurement gaps. In one embodiment, the UE requests measurement gaps via RRC using an RRC message in order to enable positioning measurements on cells the assistance data for which is received via LPPe or any user plane protocol (e.g. SUPL).

Advantageous embodiments herein address the deficiencies of the current LTE specification with a UE configured to perform the following method. The method includes in step 1 the UE receiving assistance data not in LPP otdoa-RequestAssistanceData, or assistance data not covered by the requirements in 3GPP TS 36.133. The UE may receive such assistance data via LPPe or any user plane protocol (e.g. SUPL). Moreover, the assistance data may comprise assistance data for timing measurements in LTE or other RAT e.g. CDMA, GSM, or WCDMA.

The method continues with the UE interpreting the requested measurements as measurements for which the UE is allowed to request measurement gaps via RRC. In this regard, the method includes sending a measurement gap request via RRC.

Correspondingly, the method follows with receiving a measurement gap configuration from the network and configuring measurement gaps accordingly. Finally, the method entails performing measurements using the assistance data received in step 1 and the configured measurement gaps.

In another embodiment, in addition to Step 1 the UE also receives assistance data in LPP otdoa-RequestAssistanceData, where the requested measurements in the assistance data in LPP otdoa-RequestAssistanceData are interpreted as inter-frequency measurements. In yet another embodiment, the assistance data in LPP otdoa-RequestAssistanceData are artificially configured to simulate inter-frequency measurements. Further, when the eNodeB receives the request for measurement gaps, it by default configures measurement gaps to enable measurements for the assistance data received in the described above Step 1. In a specific example, the measurement gap configuration is optimized for measurements in another RAT, e.g. CDMA or GSM. In the next embodiment, the UE may also perform measurements using the configured measurement gaps and for the assistance data received in LPP otdoa-RequestAssistanceData (in addition to those for the assistance data received in Step 1).

Figure 18:
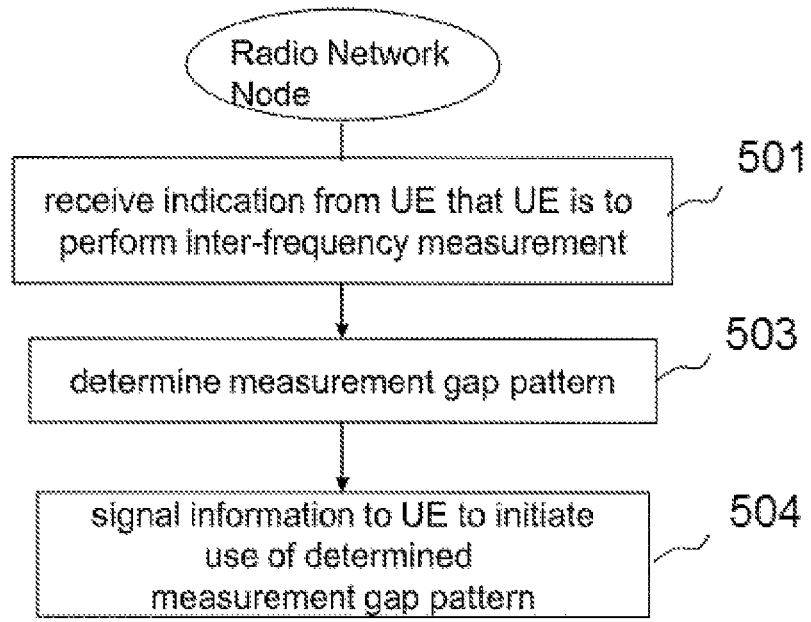
FIG. 18 is a flow diagram illustrating an alternative exemplary embodiment of a method in a radio network node for supporting configuration of a measurement gap pattern for a UE requiring measurement gaps for performing an inter-frequency measurement.

In view of the above described variations and modifications, those skilled in the art will appreciate that a base station 40-s herein generally performs the method 100 illustrated in FIG. 18. As shown in FIG. 18, the method 100 includes obtaining information that indicates one or more non-serving frequencies $f_1$, $f_2$ on which the wireless device 36 is to perform one or more positioning measurements (Block 110). The method then includes, for at least one non-serving frequency $f_1$, $f_2$ indicated by the information, configuring a measurement gap (during which the wireless device 36 is to perform a corresponding positioning measurement) to occur during a period of time in which a neighboring cell 42-1, 42-2 transmits a positioning reference signal 46-1, 46-2 over that non-serving frequency $f_1$, $f_2$ (Block 120).

Figure 19:
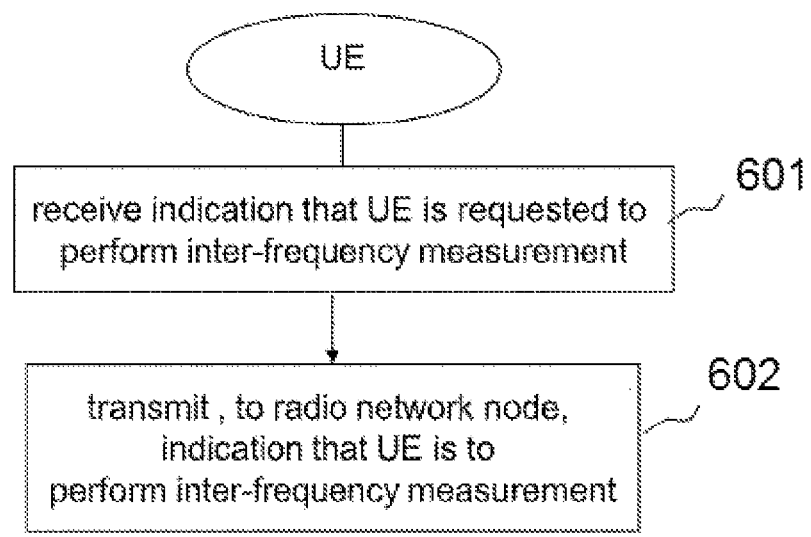
FIG. 19 is a flow diagram illustrating an exemplary embodiment of a method in a UE for supporting configuration of a measurement gap pattern for the UE for performing an inter-frequency measurement.

Likewise, those skilled in the art will appreciate that a mobile terminal 36 herein generally performs the method 200 illustrated in FIG. 19. As shown in FIG. 19, the method 200 includes obtaining information that indicates one or more non-serving frequencies $f_1$, $f_2$ on which the wireless device 36 is to perform one or more positioning measurements (Block 210). The method then includes transmitting to the base station 40-s the information and a request for the base station 40-s to configure one or more measurement gaps during which the wireless device 36 is to perform the one or more positioning measurements (Block 220).

Figure 20:
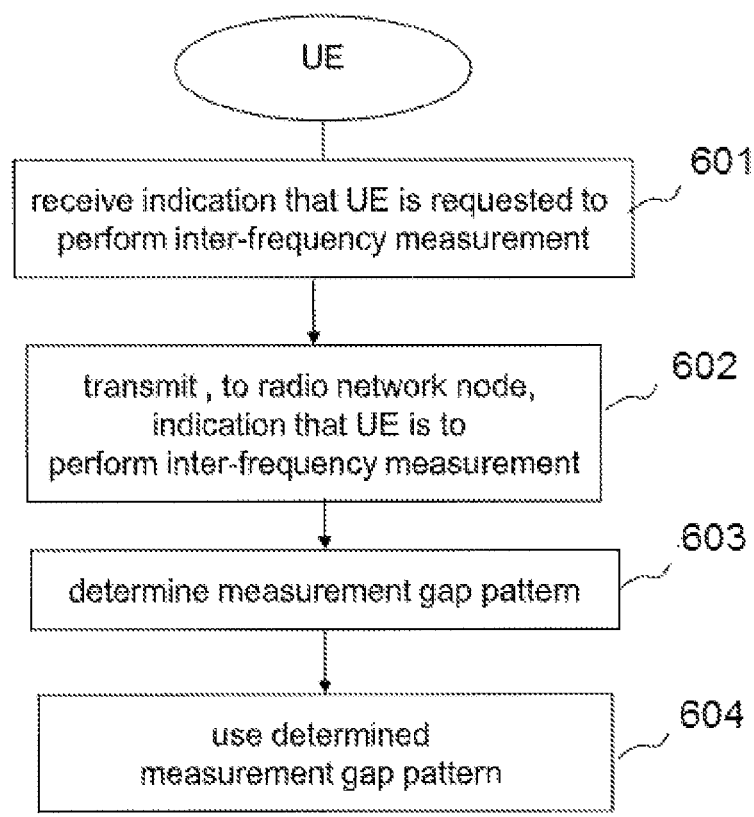
FIG. 20 is a flow diagram illustrating an alternative exemplary embodiment of a method in a UE for supporting configuration of a measurement gap pattern for the UE for performing an inter-frequency measurement.

Furthermore, those skilled in the art will appreciate that a network node 44 herein generally performs the method 300 illustrated in FIG. 20. As shown in FIG. 20, the method 300 includes obtaining information that indicates one or more non-serving frequencies $f_1$, $f_2$ on which the wireless device 36 is to perform one or more positioning measurements (Block 310), and then sending the obtained information to the base station 40-s (Block 320).

Figure 21:
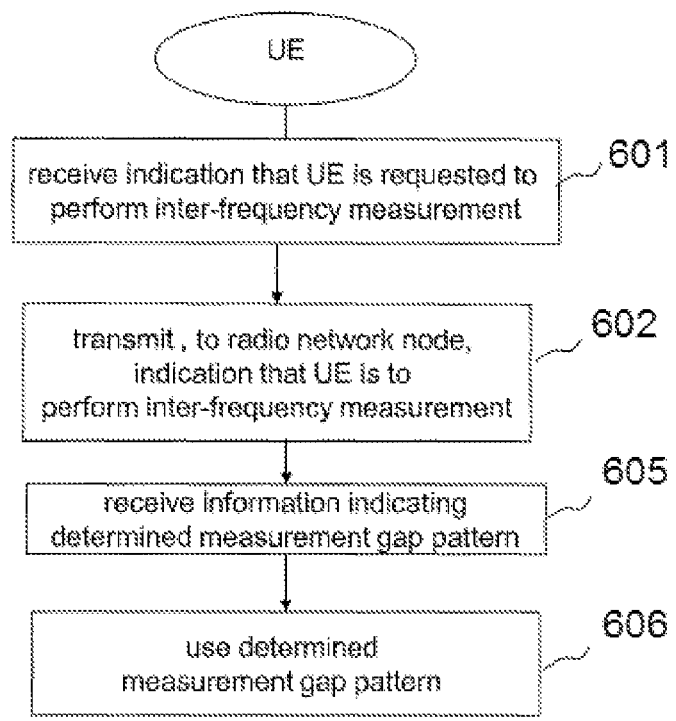
FIG. 21 is a flow diagram illustrating another alternative exemplary embodiment of a method in a UE for supporting configuration of a measurement gap pattern for the UE for performing an inter-frequency measurement.

Alternatively or additionally, the network node 44 may generally perform the method 400 illustrated in FIG. 21. As shown in FIG. 21, the method 400 includes obtaining information that indicates whether or not the base station 40-s is capable of configuring one or more measurement gaps during which the wireless device 36 can perform one or more positioning measurements on one or more non-serving frequencies $f_1$, $f_2$ (Block 410). Then, if the base station 40-s is capable of configuring the one or more measurement gaps, the method entails sending a request to the wireless device 36 requesting that the wireless device 36 perform the one or more positioning measurements with respect to at least one neighboring cell 42-1, 42-2 (Block 420). Otherwise, if the base station 40-s is not capable, the method may entail refraining from sending such request to the wireless device 36.

Throughout the subsequent portions of this description, the term "UE" is used as a non-limiting term which means any wireless device or node, e.g. PDA, laptop, mobile, sensor, fixed relay, mobile relay or even a small base station that is being positioned when timing measurements for positioning are considered, i.e. a LCS target in general. The UE may also be an advanced UE capable of such advanced features as carrier aggregation, but which may still require measurement gaps for performing measurements on at least some cells and at least some carrier frequency.

Also throughout the subsequent portions of this description, a cell is associated with a radio network node, where a radio network node comprise in a general sense any node capable of transmitting and/or receiving radio signals that may be used for positioning and/or measurements, such as e.g., an eNodeB, macro/micro/pico base station, home eNodeB, relay, beacon device, or repeater. The radio network node may be a single-RAT or multi-RAT or multi-standard radio base station. Note that downlink and uplink transmissions do not need to be between the UE and the same radio network node.

Additionally throughout the subsequent portions of this description, A positioning server described in different embodiments is a node with positioning functionality. For example, for LTE it may be understood as a positioning platform in the user plane, e.g., SLP in LTE, or a positioning server in the control plane, e.g., ESMLC in LTE. SLP may also consist of SLC and SPC, as explained above, where SPC may also have a proprietary interface with E-SMLC. In a testing environment, at least the positioning server may be simulated or emulated by test equipment.

The signalling described in the different embodiments is either via direct links or logical links, e.g. via higher layer protocols such as RRC and/or via one or more network nodes. For example, in LTE in the case of signalling between E-SMLC and the LCS Client the positioning result may be transferred via multiple nodes, at least via MME and Gateway Mobile Location Centre GMLC.

Herein the term "measurement gap indication" will be used to refer to a message which indicates a need for measurement gaps for a UE. The measurement gap indication may also contain additional information such as information specifying a frequency to which the measurement relates. There may be a specific measurement gap indications used for a specific positioning method, e.g. OTDOA.

At least in some embodiments, inter-frequency measurements shall be understood in a general sense comprising, e.g., inter-frequency, inter-band, or inter-RAT measurements. Some non-limiting examples of inter-frequency positioning measurements are inter-frequency E-CID measurements such as UE Rx–Tx time difference, RSRP and RSRQ, and inter-frequency RSTD measurements for OTDOA positioning.

At least some embodiments described herein are not limited to LTE, but may apply with any RAN, single- or multi-RAT. Some other RAT examples are LTE-Advanced, UMTS, GSM, cdma2000, WiMAX, and WiFi.

According to current 3GPP standards an eNodeB can use the following three different pre-defined measurement gap configurations for a UE to perform inter-frequency and inter-RAT measurements. The inter-frequency measurement implies measuring a carrier frequency which is different from that of the serving carrier frequency. The serving carrier frequency and inter-frequency carrier can both belong to Frequency Division Duplex (FDD) mode or Time Division Duplex (TDO) mode or any combination thereof.

According to a first pre-defined measurement gap configuration, no measurement gaps are configured. In this case, the UE is capable of performing inter-frequency and/or inter-RAT measurements without measurement gaps. This may be the case for example, if the UE has multiple receivers, which can be activated in parallel. An example is that of a multi-carrier capable UE, i.e. a UE which is capable of receiving data over more than one carrier.

According to a second pre-defined measurement configuration, measurement Gap Pattern #0 (also referred to as Gap Pattern 0) is configured. When the UE is configured with the Gap Pattern #0 for performing positioning measurements, there is no degradation of the UE inter-frequency/inter-RAT neighbor cell and positioning measurement performance. This is because according to this pattern the gaps are significantly dense and frequent i.e. a gap of 6 ms occurs every 40 ms. This means that the mobility and the positioning, e.g., OTDOA or E-CID, measurement requirements as specified in the standard shall be met.

According to a third pre-defined measurement configuration, measurement Gap Pattern #1 (also referred to as Gap Pattern 1) is configured. According to Gap Pattern #1 a gap of 6 ms occurs every 80 ms. There is a risk that UE inter-frequency/inter-RAT neighbor cell and positioning measurement performance are degraded if this pattern is used. This is due to longer periodicity of the occurrence of the measurement gaps compared to the Gap Pattern #0. A consequence could for example be significantly longer measurement period of one or more of the above measurements in order to meet the corresponding target accuracy requirements.

It should also be noted that an inter-frequency measurement configuration does not include only gap pattern, but also, for example, subframe gap offset and may include other parameters such as the SFN offset, frame offset etc.

To ensure a desired performance it is desirable that an appropriate measurement gap configuration is configured at the UE when positioning measurements, e.g., OTDOA measurement such as RSTD, are to be performed by the UE during measurement gaps. In the above E-UTRA example, the measurement Gap Pattern #0 should be configured when the UE is requested to measure the inter-frequency RSTD measurement for positioning. Furthermore, to ensure the desired performance it is also desirable that the measurement gap configuration is decided such that a sufficient amount of the reference signals, which are used for the positioning measurements in measurement gaps, fall in the measurement gaps. In E-UTRAN, the positioning reference signals (PRS) are examples of a reference signal.

The objective of configuring an appropriate measurement gap pattern can be achieved by ensuring that the radio network node, which configures the measurement gaps, is aware of that the UE has been requested to perform one or more positioning related measurements, which requires measurement gaps, and of the timing of the occurrence of the reference signals used for the positioning measurements in gaps. Examples of information that may be used to indicate timing of the occurrence of the reference signals are timing offset such as SFN offset, frame offset, subframe offset or more specifically subframe gap offset described earlier.

Hence, embodiments described in further detail below provide the radio network node with the necessary information pertaining to the positioning measurements to be done during the measurement gaps in order to enable the radio network node to configure the appropriate measurement gap pattern for performing the positioning measurements.

In case the gaps for the positioning measurements are configured by the eNodeB, in order for the eNodeB to configure appropriate measurement gaps, information related to the measurements for the UE needs to be provided to or made available at the eNodeB.

Figure 1:
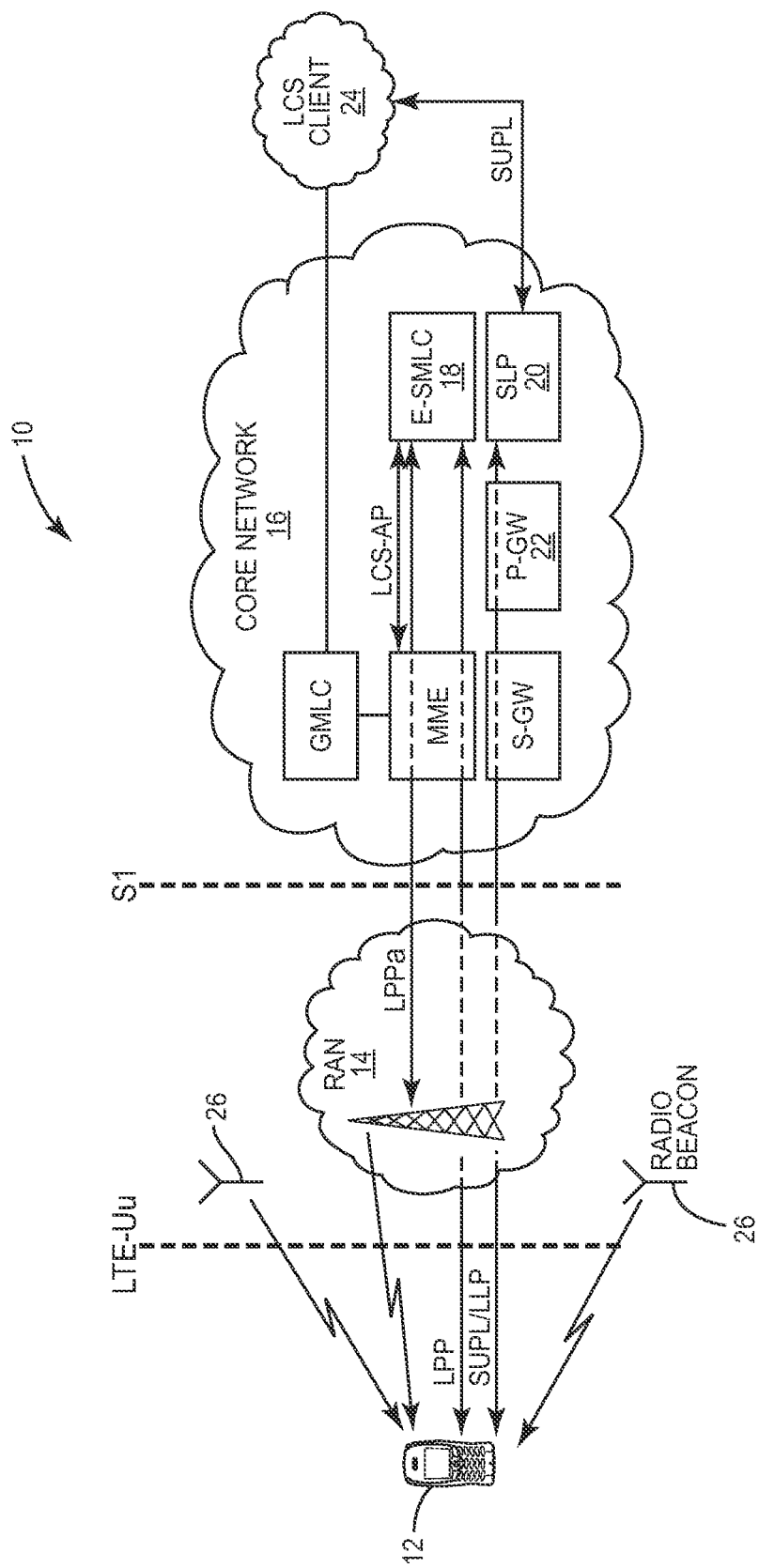
FIG. 1 is a block diagram of an LTE system configured to determine the geographic position of a user equipment.

Assuming an architecture such as shown in FIG. 1, exemplary embodiments will be described below. These exemplary embodiments involve gap configuration based on explicit indication by the positioning server or UE, implicit indication by assistance data according to which the positioning server or UE forwards assistance data to the eNodeB, packet sniffing, pre-defined rules and autonomous detection. The solutions according to all embodiments described below are applicable when the UE is in a non-Discontinuous Receive (DRX) state or in a DRX state. The embodiments are described in more detail below.

According to an embodiment which involves an explicit indication by the positioning server, the radio network node, e.g., eNodeB in E-UTRAN, changes or configures the gap configuration(s) for a particular UE, where the configuration is based on the available information regarding the positioning measurements, e.g., OTDOA RSTD inter-frequency measurements or E-CID inter-frequency measurements in E-UTRAN. The information can be cell-specific or specific for a group of UEs or for a particular UE, and it is provided to the eNodeB by the positioning server, either on request or without it e.g., by periodic or event-triggered update. Reception of such information may also be used to trigger a change of an existing gap configuration in case the existing configured gap pattern is not appropriate for the positioning measurements to be performed.

According to an exemplary embodiment, the positioning server, e.g. E-SMLC, sends a gap configuration switching indicator, cell-specific or UE-specific, to the eNodeB. The gap configuration switching indicator instructs the eNodeB to use the appropriate gap configuration for the specified UEs, a group of UEs or all UEs conducting inter-frequency measurements in the cell. The gap configuration switching indicator may e.g. be '1' when inter-frequency measurements are to be used by the specified UEs, a group of UEs or all UEs conducting inter-frequency measurements in the cell. In case the eNodeB is already using a gap pattern for a particular UE, which is not appropriate for the positioning measurement to be performed (e.g., if the pattern is expected to degrade the performance), then the eNodeB switches the existing gap pattern for that UE to the appropriate one. The appropriate gap pattern is either pre-defined or explicitly indicated by the positioning server. The positioning server also provides the information related to the carrier frequency over which the positioning measurements, e.g., RSTD, are to be performed by the UE(s) in measurement gaps. Other information, such as whether the cells on the carrier frequency are asynchronous or synchronous or timing information of the reference signals, etc., can also be provided by the positioning server to the eNodeB, which can use this to determine the most appropriate gap pattern for the measurements.

The eNodeB may optionally send an acknowledgement (ACK) to the E-SMCL to acknowledge reception of the indicator which is sent by the E-SMLC to the eNodeB. Thus the E-SMLC receives the ACK if it is used.

Further, according to an exemplary embodiment, the eNodeB sends gap reconfiguration information, e.g., details of gap pattern, subframe gap offset, frame offset, SFN offset, etc., to the UE by broadcast/multicast or unicast or a UE-specific message, e.g., via RRC signalling, where the gap configuration contains all the necessary and standardized information necessary for the UE to configure measurement gaps. The eNodeB may also store the gap configuration for each UE. The information signalled to the UE can comprise at least a time or a reference point from when the gap configuration shall apply, and/or a measurement gap configuration as such.

In a variation of the embodiment of explicit indication to the eNodeB, the eNodeB receives the information necessary for gap reconfiguration from a Network Management (NM) and O&M node instead of from the positioning server. In this case, information originating from the positioning node is also communicated to the NM and O&M node.

In a further variation of the embodiment of explicit indication to the eNodeB, the eNodeB receives the information necessary for appropriate measurement gap configuration or reconfiguration from the UE. The UE is made aware of that it is going to perform an inter-frequency measurement for positioning when the positioning server requests such measurements from the UE. Accordingly the UE may signal an explicit indication to indicate to the radio network node that it requires measurement gaps.

According to an embodiment which involves implicit indication, assistance data is forwarded to the eNodeB to inform the eNodeB that the UE will be performing a measurement for which measurement gaps need to be configured. According to one alternative, the positioning server signals the assistance data or certain elements of the assistance data for each UE or group of UEs to the radio network node. In the E-UTRAN example illustrated in FIG. 1 this means that the E-SMLC signals the assistance data or part of it to the eNodeB over the LPPa protocol. The eNodeB may also send an acknowledgement message to the E-SMLC in the same way as explained above for the exemplary embodiment with an explicit indication. The elements of the assistance data that is signalled to the eNodeB will according to an exemplary embodiment contain at least information related to the carrier frequencies of the cells which are to be used for the positioning measurements. The radio network node (i.e. the eNodeB in this example) is aware of the serving carrier frequency f1 of the UE. In case the assistance data received by the radio network node contains more than one carrier frequency, e.g., f1 and f2, or if it contains one or more carrier frequencies f2 which are different than that of the serving carrier frequency, then the radio network node can use this information to deduce that the UE is requested to do inter-frequency measurements for positioning, e.g. inter-frequency RSTD measurements. These measurements are carried out by the UE in measurement gaps. Hence the eNodeB may use this information to configure the measurement gaps, which are relevant for the positioning measurements to be performed in the measurement gaps. In E-UTRAN, this means that the eNodeB can use the received assistance data or part of it and e.g. configure Gap Pattern 0 or modify an existing Gap Pattern 1 to the Gap Pattern 0 for all measurements to be performed in measurement gaps. The configuration or modification of the measurement gaps can be done in the same manner as explained above. Accordingly the radio network node may signal information to the UE to initiate use of an appropriate gap pattern in the UE. The information signalled to the UE may e.g. comprise a determined measurement gap pattern, an indication of or reference to a pre-defined measurement gap pattern, and/or a time or reference point from when the measurement pattern to be configured is to apply.

The assistance data is sent from the positioning server to the UE in order to facilitate the UE to perform the positioning measurements, e.g., RSTO in case of OTDOA or signal strength/quality measurements for enhanced cell, etc. For example in E-UTRAN, the assistance data is sent to the UE over the LPP protocol and is specified in section 6.5.1.2 in 3GPP TS 36.355 V 9.1.0 (2010-03), Evolved Universal Terrestrial Radio Access (E-UTRA); LTE Positioning Protocol (LPP) (Release 9). Since the LPP protocol is between the UE and the E-SMLC the eNodeB does not receive the assistance data when it is transmitted from the E-SMLC to the UE. As explained above, the idea of the above described embodiment is that the assistance data or a part of the assistance data, which is sent to the UE, is also forwarded by the positioning node to the radio network node, e.g., eNodeB. In a variation of this embodiment the assistance data or part of the assistance data is forwarded to the radio network node by the UE. According to an example the data elements that are sent to the eNodeB are UE specific, sent over LPPa and are the data elements of the information element OTDOA-NeighbourCellInfoList specified in section 6.5.1.2 in 3GPP TS 36.355 cited above as follows: "OTDOA-NeighbourCellInfoList The IE OTDOA-NeighbourCellInfoList is used by the location server to provide neighbour cell information for OTDOA assistance data. The OTDOA-NeighbourCellInfoList is sorted according to the best measurement geometry at the a priori location estimate of the target device, i.e., the target device is expected to provide measurements in increasing neighbor cell list order (to the extent that this information is available to the target device).

measurement gaps. If the radio network node which configures the measurement gaps is an eNodeB, the eNodeB can sniff packets with LPP or similar messages which are sent to the UE by the positioning sever. The sniffed messages may contain the assistance information to be used by the UE for performing the positioning measurements, e.g., inter-frequency carrier etc. The messages which contain the assistance information pass over the eNodeB transparently. Hence the eNodeB can sniff these messages. The assistance information which is acquired by sniffing enables the eNodeB to decide whether to configure a measurement gap pattern for performing inter-frequency positioning measurements or not. The measurement gap pattern may e.g. be a gap pattern which is pre-defined for positioning measurements such as Gap Pattern #0. For example, if the eNodeB detects by sniffing the assistance information that there are at least two cells in the assistance data operating on different frequencies, e.g., cell 1 and cell 2 operating on frequencies f1 and f2 respectively,

```
--AN1START
OTDOA-NeighbourCellInfoList ::= SEQUENCE (SIZE (1..maxFreqLayers)) OF
OTDOA-NeighbourFreqInfo
OTDOA-NeighbourFreqInfo ::= SEQUENCE (SIZE (1..24)) of OTDOA-
NeighbourCellInfoElement
OTDOA-NeighbourCellInfoElement ::= SEQUENCE {
    physCellId              INTEGER (0..503),
    cellGlobalId            ECGI              OPTIONAL,
    earfcn                  ARFCN-ValueEUTRA            OPTIONAL,    --
Cond NotSameAsRef0
    cpLength                ENUMERATED {normal, extended, ...}
                                        OPTIONAL,       -- Cond
NotSameAsRef1
    prsInfo                 PRS-Info          OPTIONAL,       -- Cond
NotSameAsRef2
    antennaPortConfig       ENUMERATED {ports-1-or-2, ports-4, ...}
                                        OPTIONAL, -- Cond
NotSameAsRef3
    slotNumberOffset        INTEGER(0..31)    OPTIONAL,       -- Cond
NotSameAsRef4
    Prs-SubframeOffset      INTEGER (0..1279)    OPTIONAL,    --
Cond InterFreq
    expectedRSTD            INTEGER (0..16383),
    expectedRSTD-Uncertainty    INTEGER (0..1023),
    ...
}
maxFreqLayers    INTEGER ::= 3
--ASN1STOP"
```

It can be seen above that the information element contains carrier frequency information since "earfcn" is the frequency channel of the concerned cell. The eNodeB can use this information, e.g. if there is at least a carrier which is different than that of the serving carrier, to deduce whether the UE is required to perform positioning measurements, e.g., RSTO measurements, in measurement gaps or not. Accordingly the eNodeB can ensure that relevant measurement gaps are configured to facilitate measurements in gaps, such as inter-frequency RSTO measurements etc. Similarly the assistance data or part of it, such as carrier frequency information, related to other positioning methods than OTDOA, like e.g. enhanced cell 10 can also be signalled to the eNodeB by the positioning sever or by the UE.

An alternative exemplary embodiment, which now will be explained, involves packet sniffing. This embodiment is useful in case the eNodeB does not have explicit or implicit information about the positioning measurements to be carried out by the UE during measurement gaps. Hence all actions including the determination whether a particular UE performs the inter-frequency measurements are performed by the eNodeB or the radio network node which configures the then the eNodeB can assume that measurement gaps are needed for the positioning measurements. In addition the eNodeB knows the serving carrier frequency f1, which means that the eNodeB can assume that f2 is the inter-frequency. Hence the eNodeB will configure a measurement gap pattern, or adjust an existing measurement gap pattern in case a measurement gap pattern is already in operation, to ensure that sufficient amount of the reference signals on carrier f2 fall within the measurements gaps of the configured or adjusted measurement gap pattern. The reference signal may e.g. be PRS on f2 and the measurement gap pattern may e.g. be configured or adjusted such that at least one sub-frame containing the reference signal falls within the measurement gaps. The configuration of the measurement gap patterns in the UE can be carried out in the same way as described above irrespective of whether the radio network node is made aware of the UE's need for measurement gaps for performing an inter-frequency measurement for positioning by means of sniffing or by means of another method such as explicit or implicit indication from the positioning server or the UE.

Another alternative embodiment involves a pre-defined rule in the UE. When assistance data is received by the UE, e.g., via LPP, and the UE will conduct inter-frequency measurements or another type of measurements in measurement gaps for carrier f1 and carrier f2 then the UE itself reconfigures the measurement gaps which are most relevant for the measurements to be performed. The carriers f1 and f2 can be given in the field 'earfcn' of the assistance data as mentioned above. The measurement gap to be configured or re-configured can be pre-defined in a standard. Accordingly the UE can configure the measurement gaps by itself following one or several pre-defined rules. The following pre-defined set of rules can for example be used:

```
If exist f2≠t: f1
    If (current_status==no_gaps)
        change to: gap configuration #0,
    if (current_status==gap_configuration #1)
        -> change to: gap configuration #0,
    Otherwise, no change.
```

The above exemplary pre-defined set of rules means that the UE changes a current gap configuration to the pre-defined gap pattern configuration, which is appropriate for the positioning measurements to be done in the measurement gaps, e.g., inter-frequency measurements.

In a variation of this embodiment, if the solution of pre-defined rules for the UE is used, the UE can indicate to the eNodeB that "positioning ongoing" and that it needs the Gap Pattern 0. When positioning is no longer wanted the UE can update the eNodeB again. This information "positioning ongoing" can be transferred over an X2 interface as well, e.g., to a node associated with the new serving cell of the UE when the UE performs handover, or to a neighbour node to indicate a measurement gap pattern for positioning measurements used in this cell.

Yet another exemplary embodiment involves autonomous detection in a network node. In case RS or PRS used by the UE for performing positioning measurements are configured on more than one carrier frequency in the eNodeB, then the eNodeB may be configured to always use the most appropriate gap pattern required for performing positioning measurements, e.g., the eNodeB configures only Gap Pattern 0 for all measurements in E-UTRAN. The eNodeB assumes that measurements on at least one of the carrier frequencies are done in gaps. Secondly the measurement gaps are configured to ensure that as many PRS sub-frames as possible on different carriers lie in the measurement gaps. This embodiment is useful in case the eNodeB does not have any other means to determine whether positioning measurements are done in measurement gaps or not for a particular UE.

A further exemplary embodiment involves using an X2 interface for specifically exchanging the information about cells on frequencies used for positioning. It is possible in LTE for eNodeBs to exchange information over the X2 interface. The information can be, for example, a list of all bandwidths over all carriers in the associated cells. According to this embodiment the eNodeBs, in addition to the carrier information also include information on whether the carrier is used for positioning measurements e.g., whether frequency f1 is used for PRS transmissions and/or configuring positioning subframes or the UEs conduct positioning measurements on CRS. In another embodiment, PRS transmission bandwidth is also exchanged via X2.

Yet a further exemplary embodiment involves applying a default measurement gap configuration. Examples of default configurations which may be applied are:

In a multi-RAT and/or multi-frequency system, when sites are co-located, the eNodeB can decide to use Gap Pattern 0 when different cells of the site are operating on different frequencies/RATs.

Gap Pattern 0 is always used as a default gap configuration in an eNodeB when the network provides positioning services.

Gap Pattern 0 is used as a default configuration in an eNodeB when PRS is transmitted.

Configuration of Gap pattern 0 is triggered by a positioning request.

The Gap configuration, e.g., gap pattern, of an eNodeB can be decided and configured by another node, e.g., the NM and/O&M node, a Self Organizing Network (SON) node, a macro eNodeB, etc.

The default gap configuration is used by the eNodeB when configuring the UE for inter-frequency measurements. In one embodiment, the eNodeB reconfigures the UEs to the new default gap configuration in one of the events listed above and the default configuration changes.

The embodiments enjoy a number of advantages over previous methods and apparatus, including, for example, solving the problem of incomplete support for inter-frequency measurements.

Some of the embodiments described above involves that the UE indicates a need for measurement gaps to the radio network node. Such an indication may be signaled to the radio network node by means of RRC signaling. An advantage of the UE sending the indication, rather than the positioning server, is that this embodiment is applicable for user plane positioning as well as for control plane positioning. It is not certain that the positioning server knows if the UE actually requires measurement gaps, since the positioning server might not have full knowledge of the UEs capabilities. Accordingly an advantage of having the UE itself indicate its need for measurement gaps is that it reduces the risk of configuring measurement gaps in cases where the UE does not require measurement gaps.

FIG. 17 is a flow diagram of a method in a radio network node for supporting configuration of a measurement gap pattern for a UE requiring measurement gaps for performing an inter-frequency measurement. The method comprises receiving, in a step 501, from the UE an indication that the UE is going to perform an inter-frequency measurement for positioning and that the inter-frequency measurement requires measurement gaps. The inter-frequency measurement may e.g. be a Reference Signal Time Difference, RSTD, measurement. The received indication may include an indication of a measurement gap pattern that the UE needs for performing the inter-frequency measurement. Such an indication may be an indication of a need for configuring a pre-defined measurement gap pattern, such as Gap Pattern #0 which specifies a gap of 6 ms that occurs every 40 ms.

FIG. 18 is a flow diagram illustrating an alternative embodiment in a radio network node for supporting configuration of a measurement gap pattern for a UE requiring measurement gaps for performing an inter-frequency measurement. The step 501 in which the radio network node receives, from the user equipment, an indication that the UE is going to perform an inter-frequency measurement for positioning and that the inter-frequency measurement requires measurement gaps, is the same as explained above in connection with FIG. 17. The method in FIG. 18 also comprises a step 503, in which the radio network node determines, based on the received indication, a measurement gap pattern for performing the inter-frequency measurement. A further step 504 comprises signaling to the UE information to initiate use of the determined measurement gap pattern in the UE. The information that is signaled to the UE may e.g. include a time or reference point from when the determined gap pattern is to apply and/or the determined measurement gap pattern. The information signaled to the UE may e.g. specify gap offset and/or a pattern activation time to be applied.

According to further variations of the embodiments illustrated in FIG. 17 and FIG. 18 the radio network node may store information on the determined measurement gap pattern associated with the UE. Thus the radio network node may store information on different measurement gap patterns configured for different UEs. In another variation the radio network node receives from the UE an indication that the user equipment is going to stop the inter-frequency measurement. Thus the radio network node is informed that the UE no longer needs the measurement gap pattern for performing the inter-frequency measurement.

FIG. 19 is a flow diagram of a method in a UE for supporting configuration of a measurement gap pattern for an inter-frequency measurement performed by the UE. The method comprises receiving an indication that the user equipment is requested to start an inter-frequency measurement for positioning for which the user equipment requires measurement gaps in a step 601. The indication that the UE is requested to start an inter-frequency measurement may be received from a positioning server such as an E-SMCL or SLP. In a step 602, the UE transmits, to a radio network node, an indication that the UE is going to perform an inter-frequency measurement for positioning and that the inter-frequency measurement requires measurement gaps. If the UE has capabilities for performing the inter-frequency measurement without measurement gaps it should not indicate to the radio network node that it requires measurement gaps for performing the inter-frequency measurement. The indication transmitted to the radio network node may include an indication of a measurement gap pattern that the user equipment needs for performing the inter-frequency measurement. In a variation of the illustrated embodiment, the UE also transmits to the radio network node an additional indication that indicates that the user equipment is going stop the inter-frequency measurement. The indication may apply for one or more pre-defined positioning methods, e.g., OTDOA and/or E-CIO.

As described above there are embodiments in which the radio network node configures the measurement gap pattern to be applied by the UE and other embodiments in which the UE itself configures the measurement gap pattern based on pre-defined rules in the UE. FIGS. 20 and 21 are flow diagrams illustrating embodiments according to these different alternatives.

FIG. 20 illustrates a method in which the UE itself configures a measurement gap pattern to be used for inter-frequency positioning measurements. The method comprises the steps 601 and 602 which are the same as described above in connection with FIG. 19. In addition the method comprises a step 603 in which the UE determines the measurement gap pattern to be used for performing the inter-frequency measurement. The step 603 is initiated in response to receiving the indication that the UE is requested to perform the inter-frequency measurement. The UE determines the measurement gap pattern based on a pre-defined set of rules. In a step 604 the determined measurement gap pattern is configured in the UE.

FIG. 21 illustrates a method in which the UE receives information on the determined measurement gap configuration from the radio network node. The method comprises the steps 601 and 602 which are the same as described above in connection with FIG. 19. In addition the method comprises a step 605 in which the UE receives from the radio network node information indicating a determined measurement gap pattern to be used for performing the inter-frequency measurement. In a step 606 the UE uses the determined measurement gap pattern.

In a variation the methods illustrated in FIGS. 20 and 21 also includes as step in which the UE determines based on the UE's capabilities that it requires measurement gaps to perform the inter-frequency measurement for positioning. If the UE is capable of performing the inter-frequency measurement for positioning, the UE should of course not send any indication to the radio network node that it requires measurement gaps for performing the inter-frequency measurement for positioning.

Figure 10:
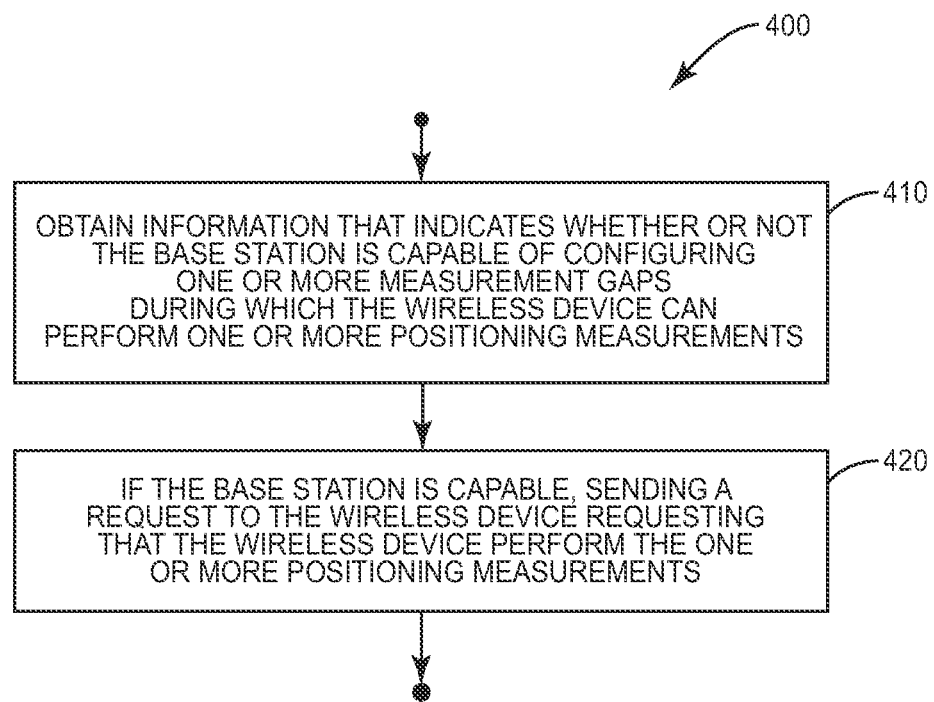
FIG. 10 is a logic flow diagram of a method implemented by a network node according to one or more other embodiments.
Figure 22:
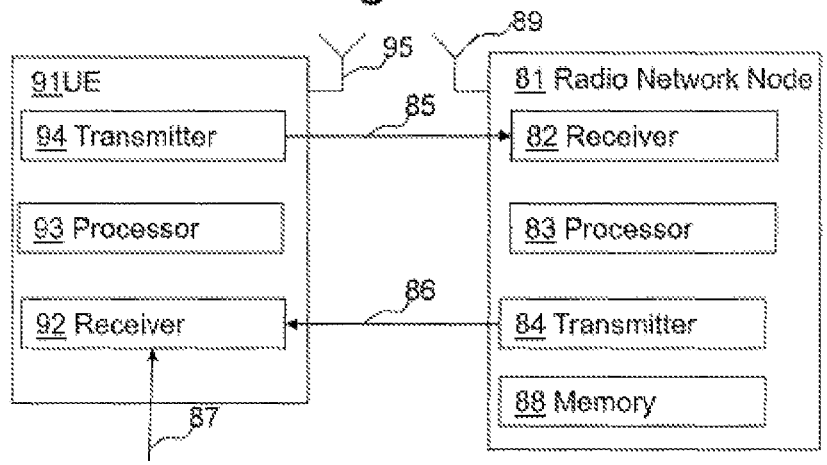
FIG. 22 is a schematic block diagram illustrating exemplary embodiments of a UE and a radio network node.

FIG. 22 is a schematic block diagram illustrating exemplary embodiments of a radio network node 81 and a UE 91 respectively, which may be configure to perform the methods illustrated in FIGS. 17-10.

The radio network node 81 comprises a receiver 82, a processor 83, a transmitter 84, and at least one antenna 89 and a memory 88. The receiver 82 may be configured to receive an indication 85 that indicates that UE is to perform an inter-frequency measurement for which the UE requires measurement gaps. The processor 83 may be configured to determine the measurement gap pattern based on the indication 85 and the transmitter 84 may be configured to transmit information 86 to the UE to initiate use of the determined measurement gap pattern. The memory 88 may store information on determined measurement gap patterns for different UEs.

The UE 91 comprises a receiver 92, a processor 93, a transmitter 94, and at least one antenna 95. The receiver 92 is configured to receive an indication 87, e.g. from a positioning server, which indicates, that the UE is requested for perform an inter-frequency measurement. The transmitter 94 is configured to transmit the indication 85 to the radio network node 81. The processor 93 may be configured to determine the measurement gap pattern to be applied according to a set of pre-defined rules.

The functional blocks depicted in FIG. 22 can be combined and re-arranged in a variety of equivalent ways, and many of the functions can be performed by one or more suitably programmed digital signal processors and other known electronic circuits e.g., discrete logic gates interconnected to perform a specialized function, or application-specific integrated circuits. Moreover, connections among and information provided or exchanged by the functional blocks depicted in FIG. 22 can be altered in various ways to enable a radio network node and a UE respectively to implement the methods described above and other methods involved in the operation of the radio network node or the UE in a wireless communication system.

Many aspects of the embodiments presented herein are described in terms of sequences of actions that can be performed by, for example, elements of a programmable computer system. Embodiments of UEs include, for example, mobile telephones, pagers, headsets, laptop computers and other mobile terminals, and the like. Moreover, some embodiments described herein can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber. Thus, there are numerous different embodiments in many different forms, not all of which are described above, that fall within the scope of the appended claims. For each of the various aspects, any such form may be referred to as "logic configured to" perform a described action, or alternatively as "logic that" performs a described action.

Several of the embodiments described above use an LTE scenario as an exemplary application scenario. LTE standard specifications can be seen as an evolution of the current wide band code division multiple access (WCDMA) specifications. An LTE system uses orthogonal frequency division multiplex (OFDM) as a multiple access technique (called OFDMA) in a downlink (DL) from system nodes to user equipments (UEs). An LTE system has channel bandwidths ranging from about 1.4 MHz to 20 MHz, and supports throughputs of more than 100 megabits per second (Mb/s) on the largest-bandwidth channels. One type of physical channel defined for the LTE downlink is the physical downlink shared channel (PDSCH), which conveys information from higher layers in the LTE protocol stack and to which one or more specific transport channels are mapped. Control information is conveyed by a physical uplink control channel (PUCCH) and by a physical downlink control channel (PDCCH). LTE channels are described in 3GPP Technical Specification (TS) 36.211 V9.1.0, Physical Channels and Modulation (Release 9) (December 2009), among other specifications.

An IMT-Advanced communication system uses an internet protocol (IP) multimedia subsystem (IMS) of an LTE, HSPA, or other communication system for IMS multimedia telephony (IMT). In the IMT advanced system (which may be called a "fourth generation" (4G) mobile communication system), bandwidths of 100 MHz and larger are being considered. The 3GPP promulgates the LTE, HSPA, WCDMA, and IMT specifications, and specifications that standardize other kinds of cellular wireless communication systems.

In an OFDMA communication system, the data stream to be transmitted is portioned among a number of narrowband subcarriers that are transmitted in parallel. In general, a resource block devoted to a particular UE is a particular number of particular subcarriers used for a particular period of time. Different groups of subcarriers can be used at different times for different users. Because each subcarrier is narrowband, each carrier experiences mainly flat fading, which makes it easier for a UE to demodulate each subcarrier. OFDMA communication systems are described in the literature, for example, U.S. Patent Application Publication No. US 2008/0031368 A1 by B. Lindoff et al.

A typical cellular communication system includes Radio network controllers (RNCs). RNCs control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. Each BS, or eNodeB which is a BS in an LTE system, serves a geographical area that is divided into one or more cell(s). Multiple antenna sectors can be said to make up the cell of any given BS, although a sector or other area served by signals from a BS can also be called a cell. In addition, a BS may use more than one antenna to transmit signals to a UE.

The BSs are typically coupled to their corresponding RNCs by dedicated telephone lines, optical fiber links, microwave links, etc. The RNCs are connected with external networks such as the public switched telephone network (PSTN), the internet, etc. through one or more core network nodes, such as a mobile switching center (not shown) and/or a packet radio service node (not shown).

It will be understood that the arrangement of functionalities depicted herein can be modified in LTE and other communication systems. For example, the functionality of the RNCs can be moved to the eNodeBs and other functionalities can be moved to other nodes in the network. It will also be understood that a base station can use multiple transmit antennas to transmit information into a cell/sector/area, and those different transmit antennas can send respective, different pilot signals.

The use of multiple antennas plays an important role in modern wireless communication systems, such as LTE systems, to achieve improved system performance, including capacity and coverage, and service provisioning. Acquisition of channel state information (CSI) at the transmitter or the receiver is important to proper implementation of multi-antenna techniques. In general, channel characteristics, such as the impulse response, are estimated by sending and receiving one or more predefined training sequences, which can also be called reference signals. To estimate the channel characteristics of a DL for example, a BS transmits reference signals to UEs, which use the received versions of the known reference signals to estimate the DL channel. The UEs can then use the estimated channel matrix for coherent demodulation of the received DL signal, and obtain the potential beam-forming gain, spatial diversity gain, and spatial multiplexing gain available with multiple antennas. In addition, the reference signals can be used to do channel quality measurement to support link adaptation.

In the case of OFDM transmission, a straightforward design of a reference signal is to transmit known reference symbols in the OFDM frequency-vs.-time grid. Cell-specific reference signals and symbols are described in Clauses 6.10 and 6.11 of 3GPP TS 36.211 V9.0.0, Evolved Universal Terrestrial Radio Access (E-UTRA), Physical Channels and Modulation (Release 9) (December 2009). Up to four cell-specific reference signals corresponding to up to four transmit antennas of an eNodeB are specified. Such reference signals are used by the eNodeB for codebook-based, multiple-stream, spatial multiplex transmission. A codebook is a predefined finite set of a number of precoding matrices having different ranks. In codebook based precoding, the UE estimates the channel matrix based on the cell-specific reference signals, carries out an exhaustive search over all precoding matrices, and reports a preferred precoding matrix indicator (PMI) to the eNodeB according to certain criteria, thereby maximizing system throughput, etc. The PMI determined by a UE can be overridden by the eNodeB.

3GPP TS 36.211 also defines a UE-specific reference signal on an antenna port 5 that is transmitted only on resource blocks upon which a corresponding physical downlink shared channel (PDSCH) is mapped. The UE-specific reference signal supports non-codebook based, single-stream beamforming transmission. In non-codebook based precoding, the precoding weight matrix applied both on UE-specific reference symbols and the data symbols is not from the codebook set but is directly calculated by the eNodeB in terms of various criteria, e.g., the weight matrix can be calculated based on eigen decomposition or on direction of arrival. In a time-division duplex (TDD) system, due to channel reciprocity, non-codebook based beamforming/precoding can reduce further uplink feedbacks and improve beamforming gain.

The DL of a LTE system can use both codebook-based precoding and non-codebook based beamforming/precoding for up to four transmit antennas. The transmission mode switch between code book-based, multiple-stream spatial multiplexing transmission and non-codebook-based, single-stream beamforming transmission is semi-statically configured via higher layer signaling.

Some communication systems, such as LTE-Advanced that is currently being specified by 3GPP, can employ more than four transmit antennas in order to reach more aggressive performance targets. For example, a system having eNodeBs with eight transmit antennas need extension of current LTE codebook-based precoding from precoder and reference signal perspectives.

Figure 6:
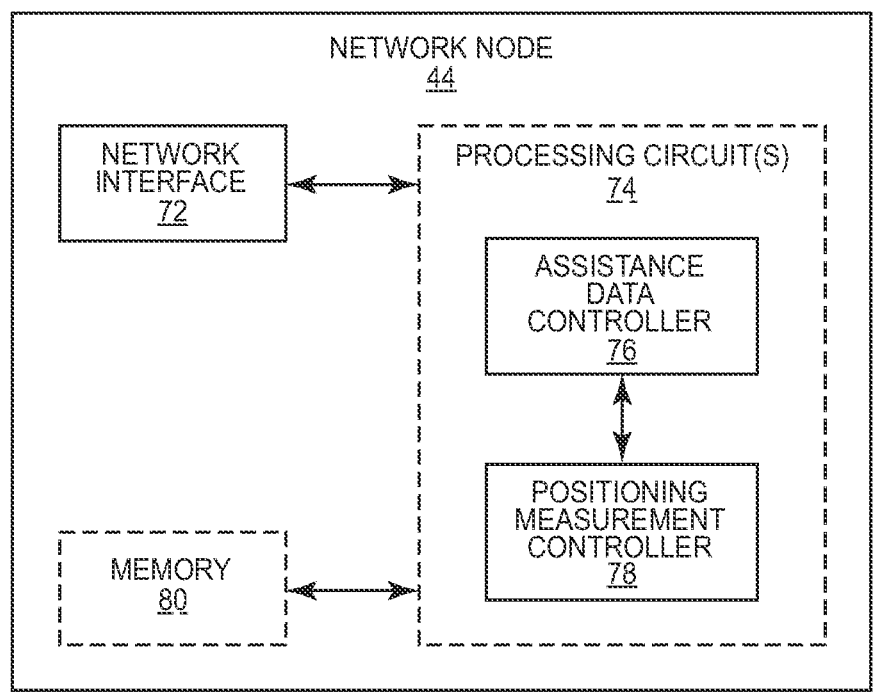
FIG. 6 is a block diagram of a network node configured according to one or more embodiments.
Figure 7:
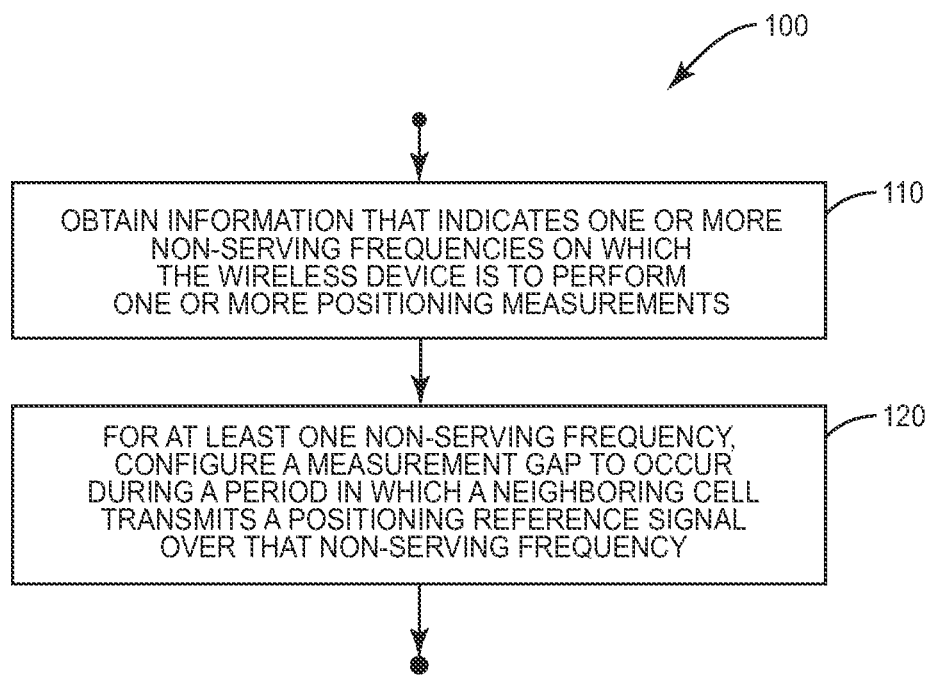
FIG. 7 is a logic flow diagram of a method implemented by a base station according to one or more embodiments.
Figure 8:
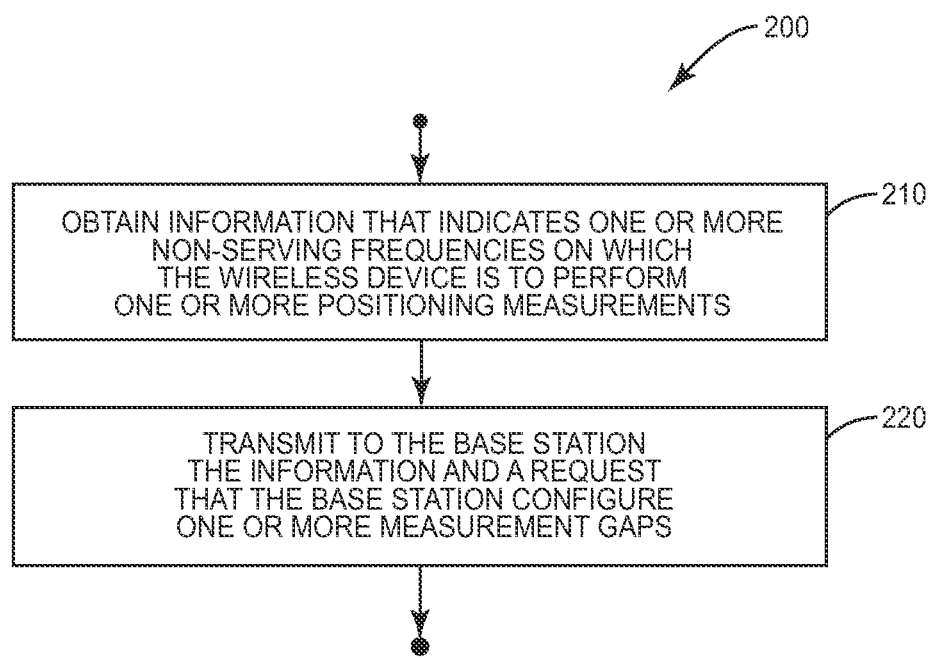
FIG. 8 is a logic flow diagram of a method implemented by a wireless device according to one or more embodiments.
Figure 9:
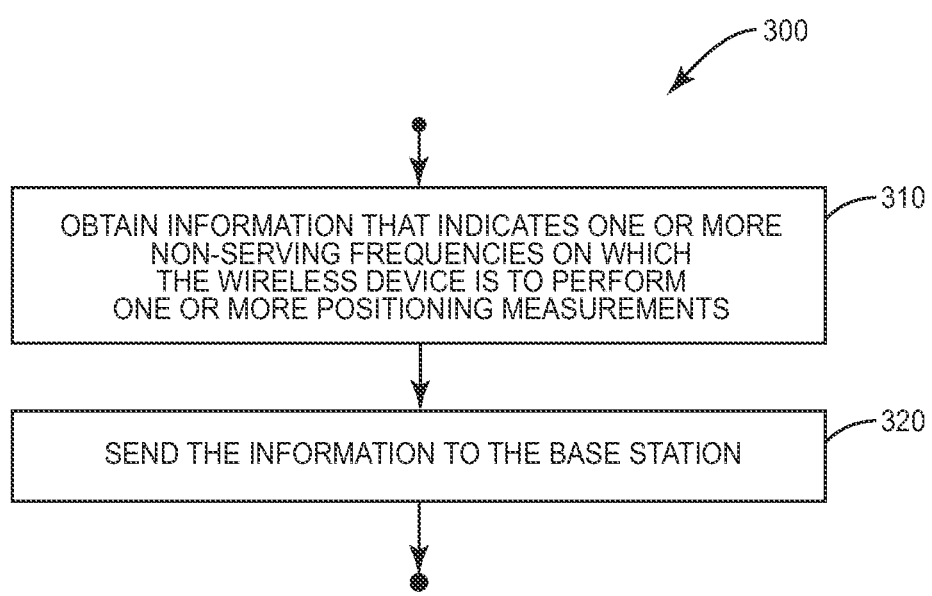
FIG. 9 is a logic flow diagram of a method implemented by a network node according to one or more embodiments.

PRS are transmitted from one antenna port (R6) according to a pre-defined pattern, as described for example in Clause 6.10.4 of 3GPP TS 36.211 V9.0.0, Evolved Universal Terrestrial Radio Access (E-UTRA), Physical Channels and Modulation (Release 9) (December 2009). One of the currently agreed PRS patterns is shown in FIG. 23, which corresponds to the left-hand side of Figure 6.10.4.2-1 of 3GPP TS 36.211, where the squares containing R6 indicate PRS resource elements within a block of twelve subcarriers over fourteen OFDM symbols (i.e., a 1-ms subframe with normal cyclic prefix).

A set of frequency shifts can be applied to the pre-defined PRS patterns to obtain a set of orthogonal patterns which can be used in neighbor cells to reduce interference on the PRS and thus improve positioning measurements. The effective frequency reuse of six can be modelled in this way. The frequency shift is defined as a function of Physical Cell ID (PCI) as follows:

$$V_{shift} = \mathrm{mod}(PCI, 6).$$

in which $V_{shift}$ is the frequency shift, mod( ) is the modulo function, and PCI is the Physical Cell ID. The PRS can also be transmitted with zero power, or muted.

To improve hearability of the PRS, i.e., to enable detecting the PRS from multiple sites and with a reasonable quality, positioning subframes have been designed as low-interference subframes, i.e., it has also been agreed that no data transmissions are allowed in general in positioning subframes. As a result, synchronous networks' PRS are ideally interfered with only by PRS from other cells having the same PRS pattern index, i.e., the same vertical shift (v_shift), and not by data transmissions.

In partially aligned asynchronous networks, PRS can still be interfered with by transmissions over data channels, control channels, and any physical signals when positioning subframes collide with normal subframes, although the interference is reduced by the partial alignment, i.e., by aligning the beginnings of positioning subframes in multiple cells within one-half of a subframe with respect to some time base. PRS are transmitted in pre-defined positioning subframes grouped by several consecutive subframes (NpRS), i.e., one positioning occasion, which occur periodically with a certain periodicity of N subframes, i.e., the time interval between two positioning occasions. The currently agreed periods N are 160, 320, 640, and 1280 ms, and the number of consecutive subframes NpRS can be 1, 2, 4, or 6, as described in 3GPP TS 36.211 cited above.

As described above, methods and apparatus according to the embodiments presented above include, but are not limited to, one or more of the following aspects: signalling to support gap configuration, methods for gap configuration and using an X2 interface for exchanging the information on the frequency used for positioning measurements.

In addition, embodiments described above can be incorporated in user- and/or control-plane positioning solutions, although the latter is currently believed to be more common, and in other positioning methods and their hybrids, in addition to OTDOA and E-CID. It will be understood that this description is given in terms of an eNodeB as the radio network node, but the description can also be given in terms of other types of radio network nodes, e.g., pico BSs, home NodeBs, etc.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a base station configured to serve a wireless device in a serving cell of a wireless communication system on a serving frequency, the method comprising:
    obtaining information that indicates one or more non-serving frequencies on which the wireless device is to perform one or more positioning measurements that are to be used for determining the wireless device's geographic position; and
    for at least one non-serving frequency indicated by the information, configuring a measurement gap during which the wireless device is to perform a corresponding positioning measurement to occur during a period of time in which a neighboring cell transmits a positioning reference signal over that non-serving frequency.

2. The method according to claim 1, wherein said obtaining comprises receiving at least some of the information within a request from the wireless device requesting that the base station configures one or more measurement gaps during which the wireless device is to perform the one or more positioning measurements on the one or more non-serving frequencies.

3. The method according to claim 1, wherein said obtaining comprises receiving at least some of the information via control signaling from a positioning node of the wireless communication system.

4. The method according to claim 3, wherein said control signaling is received from the positioning node using a Long Term Evolution (LTE) Positioning Protocol Annex, or using an LTE Positioning Protocol extension.

5. The method according to claim 1, wherein said obtaining comprises obtaining at least some of the information by inspecting higher layer communications transmitted between the wireless device and a positioning node of the wireless communication system.

6. The method according to claim 5, wherein said higher layer communications are transmitted between the wireless device and the positioning node using an Long Term Evolution (LTE) Positioning Protocol.

7. The method according to claim 1, further comprising, for at least one other non-serving frequency indicated by the information, configuring a measurement gap during which the wireless device is to perform a corresponding positioning measurement to occur during a period of time in which a neighboring cell transmits a signal other than a positioning reference signal over that non-serving frequency.

8. The method according to claim 1, wherein the information also indicates the periods of time during which one or more neighboring cells transmit respective positioning reference signals on the one or more non-serving frequencies.

9. The method according to claim 8, wherein the information indicates the period of time during which any given neighboring cell transmits a positioning reference signal as an offset from the period of time during which the serving cell transmits a positioning reference signal, or as an offset from the period of time during which a reference cell transmits a positioning reference signal, wherein positioning measurements performed on the positioning reference signal transmitted by the reference cell serve as a reference for positioning measurements performed on positioning reference signals transmitted by other cells.

10. The method according to claim 9, wherein the information indicates said offset as either a subframe offset, a System Frame Number (SFN) offset, or a positioning reference signal (PRS) subframe offset.

11. The method according to claim 1, wherein the information also identifies at least one neighboring cell on which the wireless device is to perform the one or more positioning measurements.

12. The method according to claim 1, wherein the information indicates one or more non-serving frequencies selected from two or more different possible non-serving frequencies.

13. The method according to claim 1, wherein said one or more positioning measurements comprise inter-frequency, inter-RAT, or inter-band measurements.

14. The method according to claim 1, wherein the wireless device requires one or more measurement gaps in order to perform corresponding ones of said one or more positioning measurements on the one or more non-serving frequencies.

15. The method according to claim 1, wherein said one or more positioning measurements comprise one or more timing measurements.

16. The method according to claim 15, wherein said one or more timing measurements comprise:
one or more Reference Signal Time Difference (RSTD) measurements for Observed Time Difference of Arrival (OTDOA);
one or more Receive-Transmit (Rx-Tx) time difference measurements; and
one or more Timing Advance (TA) measurements.

17. A method implemented by a wireless device in a wireless communication system, the wireless device served in a serving cell by a base station on a serving frequency, the method comprising:
obtaining information that indicates one or more non-serving frequencies on which the wireless device is to perform one or more positioning measurements that are to be used for determining the wireless device's geographic position; and
transmitting to the base station the information and a request for the base station to configure one or more measurement gaps during which the wireless device is to perform the one or more positioning measurements.

18. The method according to claim 17, wherein said transmitting comprises including the obtained information in the request.

19. The method according to claim 17, wherein the serving cell implements a serving radio access technology (RAT), wherein said obtaining comprises receiving, via at least one of a higher-layer protocol extension and user plane communications, said information in conjunction with a request for the wireless device to use said information to perform said positioning measurements on one or more neighboring cells that implement one or more non-serving RATs.

20. The method according to claim 17, further comprising:
receiving a response from the base station including information identifying when the one or more measurement gaps have been configured to occur; and
performing the one or more positioning measurements on the one or more non-serving frequencies during the one or more measurement gaps, performing at least one positioning measurement by measuring a positioning reference signal transmitted from a neighboring cell during a corresponding measurement gap using a corresponding non-serving frequency.

21. The method according to claim 17, wherein the information also indicates the periods of time during which one or more neighboring cells transmit respective positioning reference signals on the one or more non-serving frequencies.

22. The method according to claim 21, wherein the information indicates the period of time during which any given neighboring cell transmits a positioning reference signal as an offset from the period of time during which the serving cell transmits a positioning reference signal, or as an offset from the period of time during which a reference cell transmits a positioning reference signal, wherein positioning measurements performed on the positioning reference signal transmitted by the reference cell serve as a reference for positioning measurements performed on positioning reference signals transmitted by other cells.

23. The method according to claim 22, wherein the information indicates said offset as either a subframe offset, a System Frame Number (SFN) offset, or a positioning reference signal (PRS) subframe offset.

24. The method according to claim 17, wherein the information also identifies at least one neighboring cell on which the wireless device is to perform the one or more positioning measurements.

25. The method according to claim 17, wherein the information indicates one or more non-serving frequencies selected from two or more different possible non-serving frequencies.

26. The method according to claim 17, wherein said one or more positioning measurements comprise inter-frequency, inter-RAT, or inter-band measurements.

27. The method according to claim 17, wherein the wireless device requires one or more measurement gaps in order to perform corresponding ones of said one or more positioning measurements on the one or more non-serving frequencies.

28. The method according to claim 17, wherein said one or more positioning measurements comprise one or more timing measurements.

29. The method according to claim 28, wherein said one or more timing measurements comprise:
one or more Reference Signal Time Difference (RSTD) measurements for Observed Time Difference of Arrival (OTDOA);
one or more Receive-Transmit (Rx-Tx) time difference measurements; and
one or more Timing Advance (TA) measurements.

30. A method implemented by a network node in a wireless communication system, the system including a base station configured to serve a wireless device in a serving cell of the system on a serving frequency, the method comprising:
obtaining information that indicates one or more non-serving frequencies on which the wireless device is to perform one or more positioning measurements during one or more configured measurement gaps on one or more positioning reference signals transmitted by one or more neighboring cells, wherein the one or more positioning measurements are to be used for determining the wireless device's geographic position; and sending the obtained information to the base station.

31. A method implemented by a network node in a wireless communication system, the system including a base station configured to serve a wireless device in a serving cell of the system on a serving frequency, the method comprising:

obtaining information that indicates whether or not the base station is capable of configuring one or more measurement gaps during which the wireless device can perform one or more positioning measurements on one or more non-serving frequencies, wherein the one or more positioning measurements are to be used for determining the wireless device's geographic position; and if the base station is capable of configuring the one or more measurement gaps, sending a request to the wireless device requesting that the wireless device perform the one or more positioning measurements with respect to at least one neighboring cell.

32. A base station configured to serve a wireless device in a serving cell of a wireless communication system on a serving frequency, the base station comprising a measurement gap configuration circuit configured to:

obtain information that indicates one or more non-serving frequencies on which the wireless device is to perform one or more positioning measurements that are to be used for determining the wireless device's geographic position; and for at least one non-serving frequency indicated by the information, configure a measurement gap during which the wireless device is to perform a corresponding positioning measurement to occur during a period of time in which a neighboring cell transmits a positioning reference signal over that non-serving frequency.

33. A wireless device configured to be served in a serving cell of a wireless communication system by a base station on a serving frequency, the wireless device comprising:

a radio interface configured to wirelessly communicate with the base station over radio resources; and one or more processing circuits configured to:

obtain information that indicates one or more non-serving frequencies on which the wireless device is to perform one or more positioning measurements that are to be used for determining the wireless device's geographic position; and transmit to the base station, via the radio interface, the information and a request for the base station to configure one or more measurement gaps during which the wireless device is to perform the one or more positioning measurements.

34. A network node in a wireless communication system, wherein the system includes a base station configured to serve a wireless device in a serving cell of the system on a serving frequency, and wherein the network node comprises:

a communications interface configured to communicatively couple the network node to the base station and the wireless device; and one or more processing circuits configured to:

obtain information that indicates one or more non-serving frequencies on which the wireless device is to perform one or more positioning measurements during one or more configured measurement gaps on one or more positioning reference signals transmitted by one or more neighboring cells, wherein the one or more positioning measurements are to be used for determining the wireless device's geographic position; and send the obtained information to the base station via the communications interface.

35. A network node in a wireless communication system, wherein the system includes a base station configured to serve a wireless device in a serving cell of the system on a serving frequency, and wherein the network node comprises:

a communications interface configured to communicatively couple the network node to the base station and the wireless device; and one or more processing circuits configured to:

obtain information that indicates whether or not the base station is capable of configuring one or more measurement gaps during which the wireless device can perform one or more positioning measurements on one or more non-serving frequencies, wherein the one or more positioning measurements are to be used for determining the wireless device's geographic position; and if the base station is capable of configuring the one or more measurement gaps, send via the communications interface a request to the wireless device requesting that the wireless device perform the one or more positioning measurements with respect to at least one neighboring cell.

* * * * *

UNITED STATES PATENT AND TRADEMARK OFFICE
CERTIFICATE OF CORRECTION

PATENT NO. : 9,119,036 B2  
APPLICATION NO. : 14/095549  
DATED : August 25, 2015  
INVENTOR(S) : Kazmi et al.

Page 1 of 2

It is certified that error appears in the above-identified patent and that said Letters Patent is hereby corrected as shown below:

Title page

On Page 2, in Item (56), under "OTHER PUBLICATIONS", in Column 2, Lines 26-27, delete ""3rd Generation Partnership Project;".

Specification

In Column 1, Line 8, delete "Aug. 31, 2011" and insert -- Aug. 29, 2011 --, therefor.

In Column 1, Line 15, delete "2012," and insert -- 2012, now Pat. No. 8,965,414. --, therefor.

In Column 2, Line 36, delete "Mobiel" and insert -- Mobile --, therefor.

In Column 2, Line 47, delete "E-SMLC 14" and insert -- E-SMLC 18 --, therefor.

In Column 2, Line 49, delete "SLP 16" and insert -- SLP 20 --, therefor.

In Column 8, Line 41, delete "periods of time" and insert -- period of time --, therefor at each occurrence throughout the Patent.

In Column 11, Line 28, delete "CN 36" and insert -- CN 34 --, therefor.

In Column 13, Line 41, delete "$f_2$." and insert -- $f_1$, $f_2$. --, therefor.

In Column 14, Line 22, delete "circuit 34" and insert -- circuit 54 --, therefor.

In Column 14, Lines 33-34, delete "circuit 24" and insert -- circuit 54 --, therefor.

In Column 24, Line 31, delete "terminal 36" and insert -- terminal --, therefor.

Signed and Sealed this  
Twenty-third Day of February, 2016

Michelle K. Lee  
*Director of the United States Patent and Trademark Office*

CERTIFICATE OF CORRECTION (continued)
U.S. Pat. No. 9,119,036 B2

Specification

In Column 28, Line 46, delete "ofor" and insert -- for --, therefor.

In Column 29, Line 19, delete "--AN1START" and insert -- --ASN1START --, therefor.

In Column 33, Line 40, delete "going stop" and insert -- going to stop --, therefor.

In Column 37, Line 57, delete "some time" and insert -- sometime --, therefor.

Claims

In Column 38, Line 61, in Claim 6, delete "an" and insert -- a --, therefor.